US012041618B2

(12) United States Patent
Falconetti et al.

(10) Patent No.: US 12,041,618 B2
(45) Date of Patent: Jul. 16, 2024

(54) DYNAMIC SHORT PHYSICAL DOWNLINK CONTROL CHANNEL (SPDCCH) RESOURCES DETERMINATION

(71) Applicant: Telefonaktiebolaget LM Ericsson (publ), Stockholm (SE)

(72) Inventors: Laetitia Falconetti, Järfälla (SE); Niklas Andgart, Södra Sandby (SE); John Camilo Solano Arenas, Dusseldorf (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/345,923

(22) PCT Filed: Feb. 2, 2018

(86) PCT No.: PCT/EP2018/052705
§ 371 (c)(1),
(2) Date: Apr. 29, 2019

(87) PCT Pub. No.: WO2018/141931
PCT Pub. Date: Aug. 9, 2018

(65) Prior Publication Data
US 2020/0059902 A1 Feb. 20, 2020

Related U.S. Application Data

(60) Provisional application No. 62/455,284, filed on Feb. 6, 2017.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0007* (2013.01); *H04L 5/0048* (2013.01); *H04L 41/0806* (2013.01); *H04W 72/044* (2013.01)

(58) Field of Classification Search
CPC ........... H04W 72/042; H04W 72/0446; H04W 72/044; H04L 5/0007; H04L 5/0048
See application file for complete search history.

(56) References Cited

U.S. PATENT DOCUMENTS

2017/0013618 A1   1/2017  Shin
2018/0124711 A1*  5/2018  Hosseini ............... H04W 52/42
(Continued)

FOREIGN PATENT DOCUMENTS

CN   106506424 A  *  3/2017   ......... H04L 27/2691
WO   2017018618 A1    2/2017

OTHER PUBLICATIONS

International Search Report and Written Opinion dated Apr. 26, 2018 for International Application No. PCT/EP2018/052705 filed on Feb. 2, 2018, consisting of 10-pages.
(Continued)

*Primary Examiner* — Rhonda L Murphy
(74) *Attorney, Agent, or Firm* — Weisberg I.P. Law, P.A.

(57) ABSTRACT

A network node for configuring resources for a short Physical Downlink Control Channel, sPDCCH, is provided. The network node includes processing circuitry configured to determine time resources for the sPDCCH based on at least one characteristic associated with transmission, and configure a wireless device using the time resources for the sPDCCH.

17 Claims, 21 Drawing Sheets

(51) Int. Cl.
*H04L 41/0806* (2022.01)
*H04W 72/044* (2023.01)

(56) References Cited

U.S. PATENT DOCUMENTS

| | | | | |
|---|---|---|---|---|
| 2019/0141679 A1* | 5/2019 | He | | H04L 5/0007 |
| 2019/0191420 A1* | 6/2019 | Sun | | H04L 5/0053 |
| 2020/0127783 A1* | 4/2020 | Kwak | | H04L 5/0053 |
| 2021/0328735 A1* | 10/2021 | Takeda | | H04W 72/0446 |

OTHER PUBLICATIONS

3GPP TSG-RAN WG1 #87 R1-1611512; Title: Design aspects of sPDCCH; Agenda Item: 6.2.10.2.2; Source: Ericsson; Document for: Discussion, Decision; Location and Date: Reno, USA Nov. 14-18, 2016, consisting of 6-pages.

3GPP TSG RAN WG1 AH_NR Meeting R1-1700628; Title: Mini0slot for latency reduction; Agenda Item: 5.1.4; Source: NTT DOCOMO, Inc.; Document for: Discussion and Decision; Location and Date: Spokane, USA Jan. 16-20, 2017, consisting of 7-pages.

3GPP TSG RAN WG1 Meeting #87 R1-1611469; Title: Discussion on sPDCCH for sTTI; Agenda Item: 6.2.10.2.2; Source: ZTE, ZTE Microelectronics; Document for: Discussion and Decision; Location and Date: Reno, USA Nov. 14-18, 2016, consisting of 7-pages.

3GPP TSG RAN WG1 Meeting #87 R1-1611773; Title: Discussions on sPDCCH design; Agenda Item: 6.2.10.2.2; Source: LG Electronics; Document for: Discussion and Decision; Location and Date: Reno, USA Nov. 14-18, 2016, consisting of 8-pages.

3GPP TSG RAN WG1 Meeting #72 RP-161299; Title: New Work Item on shortened TTI and processing time for LTE; Agenda Item: 10.1.1; Source: Ericsson; Document for: Approval; Location and Date: Busan, Korea, Jun. 13-16, 2016, consisting of 9-pages.

3GPP TS 36.213 V14.1.0; 3rd Generation Partnership Project; Technical Specification Group Radio Access Network; Evolved Universal Terrestrial Radio Access (E-UTRA); Physical layer procedures (Release 14); Dec. 2016, consisting of 414-pages.

Japanese Office Action and English Translation dated Dec. 8, 2020 for Japanese Application No. 2019-542443, consisting of 6-pages.

3GPP TSG-RAN WG2 Meeting #97 R2-1701886; Title: Introduction of SPS into short TTI; Source: Huawei, HiSilicon; Agenda Item: 9.2.2; Document for: Discussion and Decision; Location and Date: Athens, Greece, Feb. 13-17, 2017, consisting of 5-pages.

European Search Report dated Dec. 8, 2020 for International Application No. 18703561.3, consisting of 8-pages.

3GPP TSG-RAN WG1 #90 R1-1712471; Title: Remaining details of sPDCCH design for shortened TTI; Source: Intel Corporation; Agenda Item: 5.2.1.2.2.2; Document for: Discussion and Decision; Date and location: Aug. 21-25, 2017, Pargue, Czechia, consisting of 4-pages.

Japanese Office Action and English Translation dated Aug. 30, 2022 for Application No. 2019/542443, consisting of 5 pages.

3GPP TSG RAN WG1 Meeting #87 R1-1612403; Title: Overview of sTTI operations; Agenda Item: 6.2.10.2.1; Source: Samsung; Document for: Discussion and decision; Location and Date: Reno, USA, Nov. 14-18, 2016; consisting of 5 pages.

Chinese Office Action and English Summary dated Nov. 23, 2022 for Application No. 201880023763.4, consisting of 11 pages.

3GPP TSG RAN WG1 Meeting #87 R1-1612407; Title: sPDCCH for 2-symbol sTTI; Agenda Item: 6.2.10.2.2; Source: Samsung; Document for: Discussion and decision; Location and Date: Reno, USA, Nov. 14-18, 2016, consisting of 4 pages.

* cited by examiner

FIG. 12

DYNAMIC SHORT PHYSICAL DOWNLINK CONTROL CHANNEL (SPDCCH) RESOURCES DETERMINATION

CROSS-REFERENCE TO RELATED APPLICATIONS

This application is a Submission Under 35 U.S.C. § 371 for U.S. National Stage Patent Application of International Application No.: PCT/EP2018/052705, filed Feb. 2, 2018 entitled "DYNAMIC SHORT PHYSICAL DOWNLINK CONTROL CHANNEL (SPDCCH) RESOURCES DETERMINATION," which claims priority to U.S. Provisional Application No. 62/455,284, filed Feb. 6, 2017, entitled "DYNAMIC sPDCCH RESOURCES DETERMINATION," the entireties of both of which are incorporated herein by reference.

TECHNICAL FIELD

The disclosure relates to wireless communications, and in particular, to a method, network node and wireless device for dynamic short Physical Downlink Control Channel (sPDCCH) resources determination and modification.

BACKGROUND

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. The typical size of HTTP based transactions over the internet are in the range of a few 10's of Kbytes up to 1 Mbyte. In this size range, the TCP slow start period is a significant part of the total transport period of the packet stream. During TCP slow start, the performance is latency limited. Hence, improved latency can easily be showed to improve the average throughput, for this type of TCP based data transactions.

Radio resource efficiency could be positively impacted by latency reductions. Lower packet data latency could increase the number/quantity of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 orthogonal frequency division duplexing (OFDM) or single carrier frequency division multiple access (SC-FDMA) symbols in the case of normal cyclic prefix and 12 OFDM or SC-FDMA symbols in the case of extended cyclic prefix.

Currently, work in 3GPP (see RP-161299) is ongoing on standardizing "short TTI" or "sTTI" operation, where scheduling and transmission can be done on a faster timescale. Therefore, the legacy LTE subframe is subdivided into several sTTI. Short TTI essentially refers to a short transmission duration than the LTE subframe. The supported shorter transmission duration is of length of 2, 3 and 7 OFDM symbols. The transmission duration of 2 or 3 OFDM symbols are also referred to as subslot transmission, while the transmission duration of 7 OFDM symbols is referred to as a slot. Data transmission in the downlink (DL) such as from the network node to the wireless device may happen per sTTI via the short physical downlink shared channel (sPDSCH), which may include a control region short downlink control channel (sPDCCH). In the uplink (UL), data is transmitted from the wireless device to the network node per sTTI via short physical uplink shared channel (sPUSCH); control can be transmitted via the short physical uplink control channel (sPUCCH).

Different alternatives are possible to schedule a sTTI in the UL or DL to a wireless device. In one alternative, individual wireless devices receive information about sPDCCH candidates for short TTI via radio resource control (RRC) configuration, telling the wireless device where to look for the control channel for short TTI, i.e., sPDCCH. The DCI for sTTI is actually included directly in sPDCCH. In another alternative, the DCI for sTTI is split into two parts, a slow DCI sent in PDCCH and a fast DCI sent in sPDCCH. The slow grant can contain the frequency allocation for a DL and an UL short TTI band to be used for short TTI operation, and it can also contain refinement about sPDCCH candidate locations.

3GPP Long Term Evolution (LTE) technology is a mobile broadband wireless communication technology in which transmissions from base stations (referred to as eNBs or network nodes) to mobile stations (referred to as user equipment (UE) or wireless device) are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A common term is also a physical resource block (PRB) to indicate the RB in the physical resource. Two PRBs in the same subframe that use the same 12 subcarriers are denoted a PRB pair. This is the minimum resource unit that can be scheduled in LTE.

A unit of one subcarrier and 1 OFDM symbol is referred to as a resource element (RE) see FIG. 1. Thus, a PRB consists of 84 REs. An LTE radio subframe is composed of multiple resource blocks in frequency with the number of PRBs determining the bandwidth of the system and two slots in time as shown in FIG. 2

In the time domain, LTE downlink transmissions are organized into radio frames of 10 ms, each radio frame consisting of ten equally-sized subframes of length $T_{subframe}=1$ ms.

Messages transmitted over the radio link to users can be broadly classified as control messages or data messages. Control messages are used to facilitate the proper operation of the system as well as proper operation of each wireless device within the system. Control messages could include commands to control functions such as the transmitted power from a wireless device, signaling of RBs within which the data is to be received by the wireless device or transmitted from the wireless device and so on.

In Rel-8, the first one to four OFDM symbols, depending on the configuration, in a subframe are reserved to contain such control information, as shown in FIG. 2. Furthermore, in Rel-11, an enhanced control channel was introduced (EPDCCH), in which PRB pairs are reserved to exclusively contain EPDCCH transmissions, although excluding from the PRB pair the one to four first symbols that may contain control information to wireless devices of releases earlier than Rel-11. See an illustration in FIG. 3.

Hence, the EPDCCH is frequency multiplexed with PDSCH transmissions, contrary to PDCCH which is time multiplexed with PDSCH transmissions. The resource allocation (RA) for PDSCH transmissions exists in several RA types, depending on the downlink control information (DCI) format. Some RA types has a minimum scheduling granularity of a resource block group (RBG), see TS 36.211. An RBG is a set of adjacent (in frequency) resource blocks and when scheduling the wireless device, the wireless device is allocated resources in terms of RBGs and not individual RBs.

When a wireless device is scheduled in the downlink from an EPDCCH, the wireless device shall assume that the PRB pairs carrying the DL assignment are excluded from the resource allocation, i.e., rate matching applies. For example, if a wireless device is scheduled PDSCH in a certain RBG of size 3 adjacent PRB pairs, and one of these PRB pairs contain the DL assignment, the wireless device shall assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several user equipments (UE). Each PDCCH consists of smaller parts, known as control channel elements (CCE), to enable link adaptation (by controlling the number of CCE a PDCCH is utilizing). It is specified that for PDCCH, a wireless device has to monitor 4 aggregation levels of CCEs, namely, 1, 2, 4, and 8, for wireless device-specific search space and 2 aggregation levels of CCEs, namely, 4 and 8, for common search space.

In TS 36.213, Section 9.1.1, a search space $S_k^{(L)}$ at aggregation level $L \in \{1,2,4,8\}$ is defined by a contiguous set of CCEs given by $$(Z_k^{(L)}+i) \bmod N_{CCE,k} \quad (1)$$

where $N_{CCE,k}$ is the total number of CCEs in the control region of subframe k, $Z_k^{(L)}$ defines the start of the search space, $i=0, 1, \ldots, M^{(L)} \cdot L-1$ and $M^{(L)}$ is the number of PDCCHs to monitor in the given search space. Each CCE contains 36 QPSK modulation symbols. The value of $M^{(L)}$ is specified by Table 9.1.1-1 in 36.213, as shown below:

TABLE 1

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
|  | 2 | 12 | 6 |
|  | 4 | 8 | 2 |
|  | 8 | 16 | 2 |

TABLE 1-continued

| Search space $S_k^{(L)}$ | | | Number of PDCCH |
|---|---|---|---|
| Type | Aggregation level L | Size [in CCEs] | candidates $M^{(L)}$ |
| Common | 4 | 16 | 4 |
|  | 8 | 16 | 2 |

With this definition, search space for different aggregation levels may overlap with each other regardless of system bandwidth. More specifically, wireless device-specific search space and common search space might overlap and the search spaces for different aggregation levels might overlap. See one example shown below where there are 9 CCEs in total and very frequent overlap between PDCCH candidates:

Example 1

$N_{CCE,k}=9$, $Z_k^{(L)}=\{1, 6, 4, 0\}$ for $L=\{1, 2, 4, 8\}$, respectively.

| Search space $S_k^{(L)}$ | | |
|---|---|---|
| Type | Aggregation Level L | PDCCH candidates in terms of CCE index |
| UE-Specific | 1 | {1}, {2}, {3}, {4}, {5}, {6} |
|  | 2 | {6, 7}, {8, 0}, {1, 2}, {3, 4}, {5, 6}, {7, 8} |
|  | 4 | {4, 5, 6, 7}, {8, 0, 1, 2} |
|  | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
|  | 8 | {0, 1, 2, 3, 4, 5, 6, 7}, {8, 0, 1, 2, 3, 4, 5, 6} |

After channel coding, scrambling, modulation and interleaving of the control information the modulated symbols are mapped to the resource elements in the control region. To multiplex multiple PDCCH onto the control region, control channel elements (CCE) has been defined, where each CCE maps to 36 resource elements. One PDCCH can, depending on the information payload size and the required level of channel coding protection, consist of 1, 2, 4 or 8 CCEs, and the number is denoted as the CCE aggregation level (AL). By choosing the aggregation level, link-adaptation of the PDCCH is obtained. In total, there are $N_{CCE}$ CCEs available for all the PDCCH to be transmitted in the subframe and the number $N_{CCE}$ varies from subframe to subframe depending on the number of control symbols n and the number of antenna ports configured.

As $N_{CCE}$ varies from subframe to subframe, the wireless device needs to blindly determine the position and the number of CCEs used for its PDCCH which can be a computationally intensive decoding task. Therefore, some restrictions in the number of possible blind decoding, a wireless device needs to go through have been introduced. For instance, the CCEs are numbered and CCE aggregation levels of size K can only start on CCE numbers evenly divisible by K, as shown in FIG. 4.

The set of candidate control channels formed by CCEs where a wireless device needs to blindly decode and search for a valid PDCCH are called search spaces. This is the set of CCEs on a AL a wireless device should monitor for scheduling assignments or other control information, see example in FIG. 5. In each subframe and on each AL, a wireless device will attempt to decode all the PDCCHs that can be formed from the CCEs in its search space. If the cyclic redundancy check (CRC) checks, then the content of the PDCCH is assumed to be valid for the wireless device and it further processes the received information. Often will two or more wireless devices have overlapping search spaces and the network has to select one of them for scheduling of the control channel. When this happens, the non-scheduled wireless device is said to be blocked. The search spaces vary pseudo-randomly from subframe to subframe to minimize this blocking probability.

A search space is further divided to a common and a wireless device specific part. In the common search space, the PDCCH containing information to all or a group of wireless devices is transmitted (paging, system information, etc.). If carrier aggregation is used, a wireless device will find the common search space present on the primary component carrier (PCC) only. The common search space is restricted to aggregation levels 4 and 8 to give sufficient channel code protection for all wireless devices in the cell (since it is a broadcast channel, link adaptation cannot be used). The $m_8$ and $m_4$ first PDCCH (with lowest CCE number) in an AL of 8 or 4 respectively belongs to the common search space. For efficient use of the CCEs in the system, the remaining search space is wireless device specific at each aggregation level.

FIG. 5 is an exemplifying sketch showing the search space (indicated by hatchings) a certain wireless device needs to monitor. In total, there are $N_{CCE}=15$ CCEs in this example and the common search space is marked with hatchings.

A CCE consists of 36 QPSK modulated symbols that map to the 36 RE unique for this CCE. To maximize the diversity and interference randomization, interleaving of all the CCEs is used before a cell specific cyclic shift and mapping to REs, see the processing steps in FIG. 6. In particular, all PDCCH are structured into CCE (Block S100). Scramble and modulation are performed (Block S102). Layer mapping and transmit diversity are performed (Block S104). Quadruplex based interleaving is performed (Block S106). Cyclic shift based on Cell ID is performed (Block S108). Mapping of resource element group (REG) is performed (Block S110).

Note that in most cases some CCEs are empty due to the PDCCH location restriction to wireless device search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex (group of 4) based and mapping process has a granularity of 1 REG and one CCE corresponds to 9 REGs (=36 RE).

There will also in general be a collection of REG that remains as leftovers after the set of size $N_{CCE}$ CCEs has been determined (although the leftover REGs are always fewer than 36 RE) since the number of REGs available for PDCCH in the system bandwidth is in general not an even multiple of 9 REGs. These leftover REGs are in LTE unused by the system.

Similar as for PDCCH, the EPDCCH is transmitted over radio resources shared by multiple wireless devices and enhanced CCE (eCCE) is introduced as the equivalent to CCE for PDCCH. An eCCE has also a fixed number of Res, but the number of REs available for EPDCCH mapping is generally fewer than this fixed number because many REs are occupied by other signals such as CRS and CSI-RS. Code chain rate matching is applied whenever a RE belonging to an eCCE contains other colliding signals such as the CRS, CSI-RS, legacy control region or in case of TDD, the GP and UpPTS.

Consider the example in FIG. 7, where (a) illustrates the PDCCH mapping, which avoids the CRS so that a CCE always consist of available RE. In (b), it is shown how the eCCE consists of 36 RE nominally, but the number of available RE is less in case there are colliding signals, hence RE for EPDCCH. Since the colliding signals is subframe dependent, the value of becomes subframe dependent as well and could even be different for different eCCEs if the collisions impact on the eCCEs unevenly.

It shall be noted that when the number of eCCE per PRB pair is 2 the nominal number of RE per eCCE is not 36 but instead 72 or 64 for normal and extended CP length respectively.

In Rel-11, the EPDCCH supports only the wireless device specific search space whereas the common search space remains to be monitored in the PDCCH in the same subframe. In future releases, the common search space may be introduced also for EPDCCH transmission.

It is specified that the wireless device monitors eCCE aggregation levels 1,2,4,8,16 and 32 with restrictions shown.

In distributed transmission, an EPDCCH is mapped to resource elements in up to D PRB pairs, where D=2,4, or 8 (the value of D=16 is also being considered in 3GPP). In this way frequency diversity can be achieved for the EPDCCH message. See FIG. 8 for a schematic example.

FIG. 8 shows a downlink subframe showing 4 parts belonging to an EPDCCH is mapped to multiple of the enhanced control regions known as PRB pairs, to achieve distributed transmission and frequency diversity or subband precoding.

In localized transmission, an EPDCCH is mapped to one PRB pair only, if the space allows (which is always possible for aggregation level one and two and for normal subframes and normal CP length also for level four). In case the aggregation level of the EPDCCH is too large, a second PRB pair is used as well, and so on, using more PRB pairs, until all eCCE belonging to the EPDCCH has been mapped. See FIG. 9 for an illustration of localized transmission.

FIG. 9 shows a downlink subframe showing the 4 eCCEs belonging to an EPDCCH is mapped to one of the enhanced control regions, to achieve localized transmission.

As an example, in normal subframe and with normal CP length and with $n_{EPDCCH} \geq 104$, localized transmission is using aggregation levels (1,2,4,8) and they are mapped to (1,1,1,2) PRB pairs respectively.

To facilitate the mapping of eCCEs to physical resources each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level.

These eREG belonging to an ePDCCH resides in either a single PRB pair (as is typical for localized transmission) or a multiple of PRB pairs (as is typical for distributed transmission). The exact division of a PRB pair into eREG.

sPDCCH for sTTI: sREG and sCCE configuration design

In order to quickly schedule low latency data on the short TTIs, a new short PDCCH (sPDCCH) can be defined. Since the short TTI operation is desired to coexist with legacy TTI operation, the sPDCCH should be placed in-band within PDSCH, still leaving resources for legacy data.

Legacy control channels PDCCH and EPDCCH use cell-specific reference signal (CRS) and demodulation reference signal (DMRS) demodulation, respectively. For operation in both these environment, an sPDCCH should support both CRS and DMRS, and to maintain efficiently, resources not used by sPDCCH should be used by sPDSCH (short PDSCH).

To facilitate the definition of the sPDCCH mapping to resource elements special entities are defined: sREG and sCCE. This follows the methodology used so far in the LTE specifications for defining PDCCH and ePDCCH, as described in previous section. Note that the definition of the same mapping can also be done without using these terms or by using equivalent terms.

sREG Configuration Design

The main candidate lengths for sPDCCH in time domain are 1 or 2 OFDM symbols for sTTI operation. The REs of a PRB in a given OFDM symbol of the sTTI can build one or more sREG. The number of REs in a sREG may also be variable in order to provide allocation flexibility and to support good frequency diversity.

For that, two sREG configuration options for sPDCCH are defined:
 a. PRB based sREG, which means that a sREG is built up with the complete number of REs in a PRB within 1 OFDM symbol (i.e. 12 REs per sREG for 1 OFDM symbol), or
 b. Fractioned PRB based sREG, which means that the number of REs in a PRB within 1 OFDM symbol is split and assigned to a sREG (e.g. 6 REs per sREG).

These two sREG configuration options are depicted in FIG. 10 considering 1 OFDM symbol sPDCCH and 2 OFDM symbol sPDCCH. The different letters in FIG. 10 are used to depict different indices, e.g., "A" refers to index 0, "B" refers to index 1, "C" refers to index 2 and "D" refers to index 3, each of which represents a sREG group. These two cases comprise 12 REs per sREG (options a) and 6 REs per sREG (option b). Each index, i.e. {0, 1, 2, 3}, represents a sREG group. Thus, as depicted, for 1 OFDM symbol sPDCCH up to two sREG groups can be configured and for 2 OFDM symbol sPDCCH up to four sREG groups. It can be seen that a sREG only spans a single OFDM symbol. This enables to easily extend the sPDCCH design to more OFDM symbols in time domain. Following this principle (i.e. only one OFDM symbol spanned by a sREG), one can consider the alternative fractioned PRB based sREG in which resource elements of a OFDM symbol would split in more than two sREG for instance. But the key to achieve a design adaptable to different number of OFDM symbols is that a sREG only spans a single OFDM symbol.

Further, 1 OFDM symbol sPDCCH is defined for CRS based transmissions due to the advantage of early decoding for 2 OFDM symbol sTTI. 2 OFDM symbol sPDCCH can also be configured for both 2 OFDM symbol sTTI and slot TTI as an alternative to allow a small sTTI band, i.e. to limit the number of frequency resources used for sTTI operation.

Also, for DMRS based transmissions with 2 OFDM symbol sTTI, assuming a design based on DMRS pairs in time domain as in legacy LTE, a 2 OFDM symbol sPDCCH is defined, since wireless devices need anyway to wait for the end of sTTI for channel estimation. In that case DMRS is thus not shared between sPDCCH and sPDSCH in a given PRB of the sTTI. This gives more freedom for applying beamforming for sPDCCH.

For DMRS with 1-slot sTTI, a 2 symbols sPDCCH is suitable. One DMRS pair for 1-slot TTI is preferred to be able to do channel estimation for sPDCCH and early sPDCCH decoding. Thereby, considering the presence of potential reference signals in a sTTI such as DMRS, CRS or CSI-RS, those REs occupied by these signals within a PRB are not used for a given sREG.

sCCE Configuration Design

The number of sREG required to build up a sCCE for a given sPDCCH can vary as well as their placement scheme along the frequency resources used for sTTI operation. Thus, a sCCE is defined to be composed ideally by 36 REs like an eCCE or a CCE. For that, a sCCE is composed by either PRB based sREG or fractioned PRB based sREG relying on the number of OFDM symbols assigned for sPDCCH.

In order to support good frequency diversity, or a more localized placement, localized and distributed placement schemes of sREG building up the same sCCE are defined:
 Localized scheme: sREGs building the same sCCE can be localized in frequency domain to allow for a sPDCCH resource allocation confined in a limited frequency band. This facilitates the use of beamforming for DMRS based sPDCCH.
 Distributed scheme: A distributed sREG location can be used to allow frequency diversity gains. In this case, multiple UEs may have the sREG of their sPDCCH mapped to the same PRB on different REs. Distributing over a wide frequency range also more easily makes the sPDCCH fit into one single OFDM symbol. For UEs with DMRS based demodulation, user-specific beamforming is not recommended with distributed sCCE locations.

These schemes, which are described below for building sCCE based on 1 OFDM symbol sPDCCH and 2 OFDM symbol sPDCCH, can be used for CRS and DMRS transmissions. Likewise, the following considerations can be taken into account:
 CRS and DMRS users can coexist on the same sTTI, since sPDCCH design is the same.
 If both CRS and DMRS users are given DCI in the same PRB, CRS users need to be indicated with this. Then they know that some REs are not used for sCCE. Otherwise, CRS and DMRS users have to be sent DCI in different PRBs.

Configuration of PRBs that can be Used for sPDCCH

At least one set of PRB that can be used for sPDCCH is configured per user. It is recommended to support the configuration of several sets of PRBs used for sPDCCH so as to configure one set of PRBs following the localized sPDCCH mapping and another set with the distributed mapping. The UE would monitor both sets and the eNB could select the most favorable configuration/PRB set for a given sTTI and UE.

In one case, the set of PRB assigned for the sPDCCH, which includes PRBs (no necessarily consecutive) from the available sTTI band, may be configured via RRC signaling. However, it comprises a potential resource allocation refinement in the slow DCI transmitted in PDCCH, e.g. a reduced set of PRBs or a specific set in case that several sPDCCH sets were defined. For the schemes to be described in this section and for simplicity, a system bandwidth of 10 MHz (i.e. 50 PRBs) is assumed, of which a set of 18 PRBs (no necessarily consecutive physical PRBs) is assigned by the network node for sPDCCH. All the schemes however can further comprise all system bandwidths.

In one case, the set of PRBs are configured independently, e.g. as a PRB bitmap. In another case, the set is configured based on groups of PRB. One example of already defined group of PRB in LTE is called RBG and can be used as basis in the sPDCCH mapping. Then all PRBs within the same PRB group, e.g. RBG, are jointly used.

In an embodiment, the PRBs or groups of PRBs included in the configured PRB set may be ordered according to a sequence signaled to the UE before mapping the sPDCCH to them.

OFDM Symbol sPDCCH Configuration

As depicted in FIG. 10, options 2a and 2b correspond to 2 OFDM symbol sPDCCH. Based on this, the distributed cases are depicted in FIG. 11 and the localized cases in FIG. 12. Each letter represents as CCE. These cases comprise an aggregation level of up to 8 (i.e. up to 8 sCCE per sPDCCH). The distributed cases have a regular distribution in frequency domain, while the localized cases are localized in a frequency domain (consecutive PRBs). This case further comprises that the unused PRBs shown in FIG. 11 and FIG. 12 can be further assigned for building other sCCE for other UEs as well as the possibility to be used for sPDSCH allocation. The PRB index showed in FIG. 11 and FIG. 12 represents the number within the sPDCCH PRB set (for this example, a set of 18 PRBs). For simplicity, the physical PRB number is not shown though.

SUMMARY

Some embodiments advantageously provide a method, network node and wireless device for dynamic sPDCCH resource determination and modification.

According to one aspect of the disclosure, a network node for configuring resources for a short Physical Downlink Control Channel, sPDCCH, is provided. The network node includes processing circuitry configured to determine time resources for the sPDCCH based on at least one characteristic associated with transmission, and configure a wireless device using the time resources for the sPDCCH.

According to one embodiment of this aspect, the determination of time resources for the sPDCCH includes determining a number of symbols of the sPDCCH in a subslot. In one embodiment, a subslot is a short transmission time interval, sTTI. According to one embodiment of this aspect, the at least one characteristic includes a reference signal overhead or a subslot, length. According to one embodiment of this aspect, the time resources for the sPDCCH are configured to reduce reference signal overhead for the time resources.

According to one embodiment of this aspect, the at least one characteristic includes a predefined pattern of subslots for the wireless device. According to one embodiment of this aspect, the at least one characteristic includes a transmission mode for a data channel and/or a grant for the wireless device. According to one embodiment of this aspect, the processing circuitry is further configured to: determine frequency resources for the sPDCCH where the frequency resources are determined independently from the time resources for the sPDCCH, and configure the wireless device using the frequency resources for the sPDCCH.

According to one embodiment of this aspect, frequency resources used for a short control channel element, sCCE, in 2-symbol sPDCCH correspond to frequency resources used for a sCCE in 3-symbol sPDCCH. According to one embodiment of this aspect, the processing circuitry is further configured to determine frequency resources for the sPDCCH based on time resources for the sPDCCH, and configure the wireless device using the frequency resources for the sPDCCH. According to one embodiment of this aspect, the sPDCCH is based on a Demodulation Reference Signal, DMRS.

According to one embodiment of this aspect, the sPDCCH is a two symbol sPDCCH that corresponds to a two symbol subslot, or the sPDCCH is a three symbol sPDCCH that corresponds to a three symbol subslot. According to one embodiment of this aspect, the sPDCCH is part of a downlink subframe configured for two symbol TTI, the downlink subframe being configured to include both two symbol sPDCCH and three symbol sPDCCH. According to one embodiment of this aspect, the configuring of the wireless device (44) includes transmitting a scheduling grant or assignment using the time resources for the sPDCCH.

According to another aspect of the disclosure, a method for a network node for configuring resources for a short Physical Downlink Control Channel, sPDCCH, is provided. Time resources for the sPDCCH are determined based on at least one characteristic associated with transmission, and a wireless device is configured using the time resources for the sPDCCH.

According to one embodiment of this aspect, the determination of time resources for the sPDCCH includes determining a number of symbols of the sPDCCH in a subslot. According to one embodiment of this aspect, the at least one characteristic includes a reference signal overhead or a subslot length. According to one embodiment of this aspect, the time resources for the sPDCCH are configured to reduce reference signal overhead for the time resources.

According to one embodiment of this aspect, the at least one characteristic includes a predefined pattern of subslots. According to one embodiment of this aspect, the at least one characteristic includes a transmission mode for a data channel and/or a grant for the wireless device. According to one embodiment of this aspect, determining frequency resources for the sPDCCH are determined where the frequency resources are determined independently from the time resources for the sPDCCH, and the wireless device is configured using the frequency resources for the sPDCCH.

According to one embodiment of this aspect, frequency resources used for a short control channel element (sCCE) in 2-symbol sPDCCH correspond to frequency resources used for a sCCE in 3-symbol sPDCCH. According to one embodiment of this aspect, frequency resources for the sPDCCH are determined based on time resources for the sPDCCH, and the wireless device is configured using the frequency resources for the sPDCCH. According to one embodiment of this aspect, the sPDCCH is based on a Demodulation Reference Signal (DMRS).

According to one embodiment of this aspect, the sPDCCH is a two symbol sPDCCH that corresponds to a two symbol subslot or the sPDCCH is a three symbol sPDCCH that corresponds to a three symbol subslot. According to one embodiment of this aspect, the sPDCCH is part of a downlink subframe configured for two symbol TTI, the downlink subframe being configured to include both two symbol sPDCCH and three symbol sPDCCH. According to one embodiment of this aspect, the configuring of the wireless device (44) includes transmitting a scheduling grant or assignment using the time resources for the sPDCCH.

According to one aspect of the disclosure, a wireless device for transmitting on resources indicated in a short Physical Downlink Control Channel, sPDCCH, is provided. The wireless device includes processing circuitry configured to: receive a configuration on time resources of the sPDCCH in which the time resources being based on at least one characteristic associated with transmission, and transmit according to the configuration.

According to one embodiment of this aspect, the time resources of the sPDCCH include a number of symbols of the sPDCCH in a subslot. According to one embodiment of this aspect, the at least one characteristic includes a reference signal overhead or a subslot length. According to one embodiment of this aspect, the time resources of the sPDCCH are configured to reduce reference signal overhead for the time resources. According to one embodiment of this aspect, the at least one characteristic includes a predefined pattern of subslots for the wireless device.

According to one embodiment of this aspect, the at least one characteristic includes a transmission mode for at least one of a data channel and a grant for the wireless device. According to one embodiment of this aspect, the processing circuitry is further configured to receive the configuration on frequency resources for the sPDCCH, the frequency resources being configured independently from the time resources of the sPDCCH. According to one embodiment of this aspect, frequency resources used for a short control channel element, sCCE, in 2-symbol sPDCCH is the same as frequency resources used for a sCCE in 3-symbol sPDCCH.

According to one embodiment of this aspect, the processing circuitry is further configured to receive the configuration on frequency resources of the sPDCCH, the frequency resources being configured based on the time resources of the sPDCCH. According to one embodiment of this aspect, the sPDCCH is based on a Demodulation Reference Signal, DMRS. According to one embodiment of this aspect, the sPDCCH is a two symbol sPDCCH that corresponds to a two symbol subslot, or the sPDCCH is a three symbol sPDCCH that corresponds to a three symbol subslot. According to one embodiment of this aspect, the sPDCCH is part of a downlink subframe configured for two symbol TTI in which the downlink subframe is configured to include both two symbol sPDCCH and three symbol sPDCCH. According to one embodiment of this aspect, the received configuration includes a scheduling grant or assignment.

According to one aspect of the disclosure, a method for a wireless device for transmitting on resources indicated in a short Physical Downlink Control Channel, sPDCCH, is provided. A configuration is received on time resources of the sPDCCH in which the time resources are based on at least one characteristic associated with transmission. Transmission is performed according to the configuration.

According to one embodiment of this aspect, the time resources of the sPDCCH include a number of symbols of the sPDCCH in a subslot. According to one embodiment of this aspect, the at least one characteristic includes a reference signal overhead or a subslot length. According to one embodiment of this aspect, the time resources of the sPDCCH are configured to reduce reference signal overhead for the time resources. According to one embodiment of this aspect, the at least one characteristic includes a predefined pattern of subslots for the wireless device.

According to one embodiment of this aspect, the at least one characteristic includes a transmission mode for at least one of a data channel and a grant for the wireless device. According to one embodiment of this aspect, the configuration is received on frequency resources of the sPDCCH in which the frequency resources are configured independently from the time resources of the sPDCCH. According to one embodiment of this aspect, frequency resources used for a short control channel element, sCCE, in 2-symbol sPDCCH is the same as frequency resources used for a sCCE in 3-symbol sPDCCH. According to one embodiment of this aspect, the configuration is received on frequency resources of the sPDCCH in which the frequency resources are configured based on the time resources of the sPDCCH.

According to one embodiment of this aspect, the sPDCCH is based on a Demodulation Reference Signal, DMRS. According to one embodiment of this aspect, the sPDCCH is a two symbol sPDCCH that corresponds to a two symbol subslot or the sPDCCH is a three symbol sPDCCH that corresponds to a three symbol subslot. According to one embodiment of this aspect, the sPDCCH is part of a downlink subframe configured for two symbol TTI in which the downlink subframe is configured to include both two symbol sPDCCH and three symbol sPDCCH. According to one embodiment of this aspect, the received configuration includes a scheduling grant or assignment.

According to one aspect of the disclosure, a network node for configuring resources for a short Physical Downlink Control Channel, sPDCCH, is provided. The network node includes processing circuitry configured to: determine resources for the sPDCCH in which the resources include at least one short resource element groups, sREG, where each sREG includes one resource block, RB, within one orthogonal frequency division multiplexing, OFDM, symbol that includes resource elements, REs, for cell specific reference signal, CRS, and/or demodulation reference signal, DMRS, for use in DMRS based sPDCCH, and configure a wireless device using the resources for the sPDCCH.

According to one embodiment of this aspect, the at least one sREG includes a number of sREGs per short control channel element, sCCE, in which the number of sREGs per sCCE is 4 for DMRS based sPDCCH in 2-symbol sPDCCH or 6 for DMRS based sPDCCH in 3-symbol sPDCCH. According to one embodiment of this aspect, resources include frequency resources in which the frequency resources used for a sCCE in 3-symbol sPDCCH corresponding to frequency resources used for a sCCE in 2-symbol sPDCCH.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 12 is a block diagram of 2-OFDM symbol sPDCCH localized scheme

DETAILED DESCRIPTION

Figure 1:
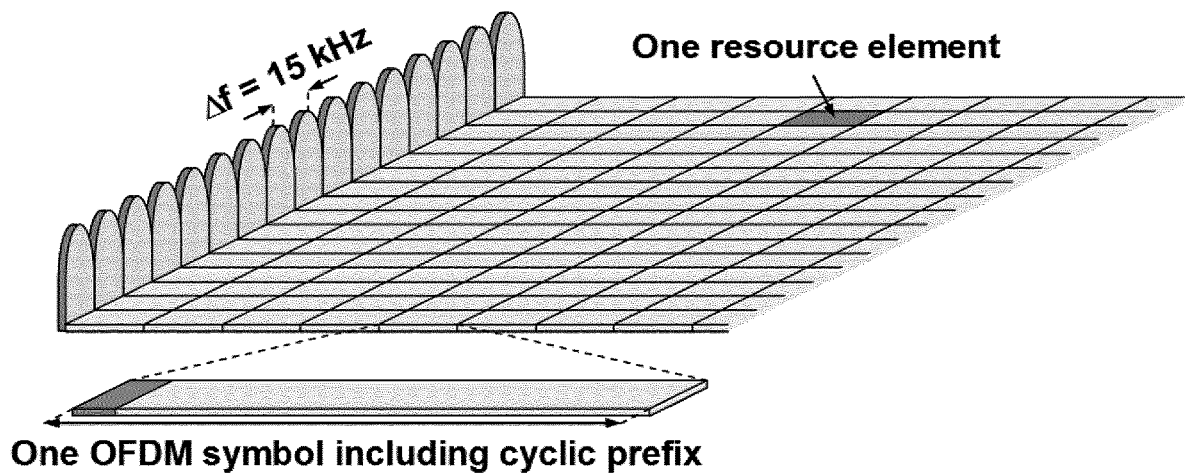
FIG. 1 is a block diagram of a time-frequency grid.
Figure 2:
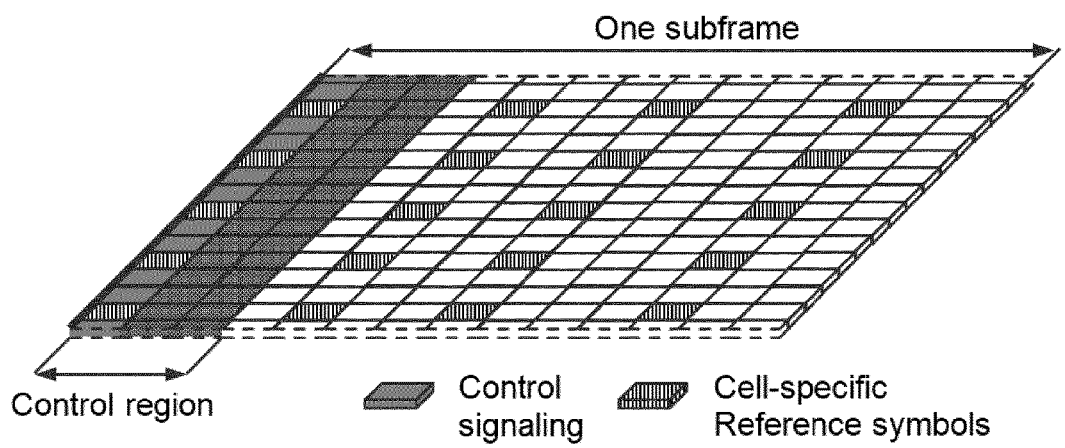
FIG. 2 is a block diagram of downlink subframe.
Figure 3:
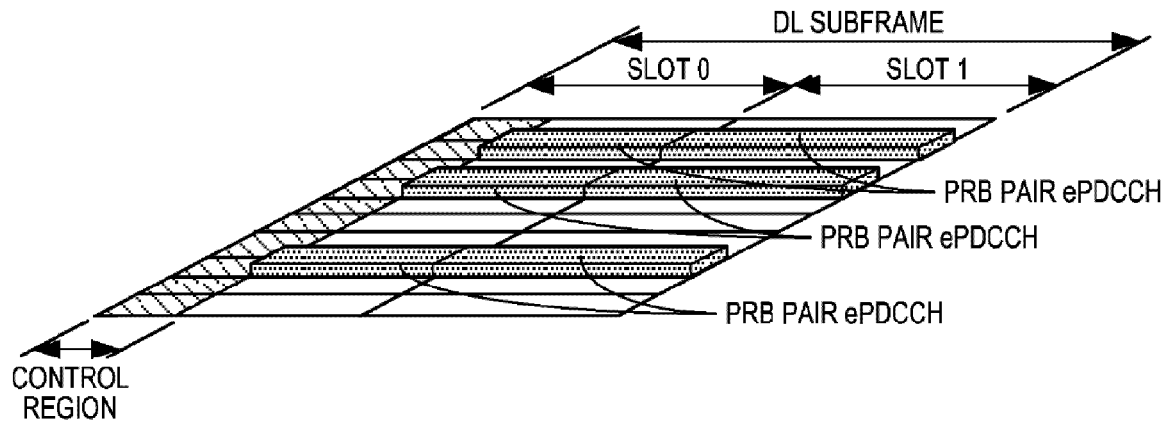
FIG. 3 is a block diagram of a downlink subframe showing 10 RB pairs and configuration of three ePDCCH regions.
Figure 4:
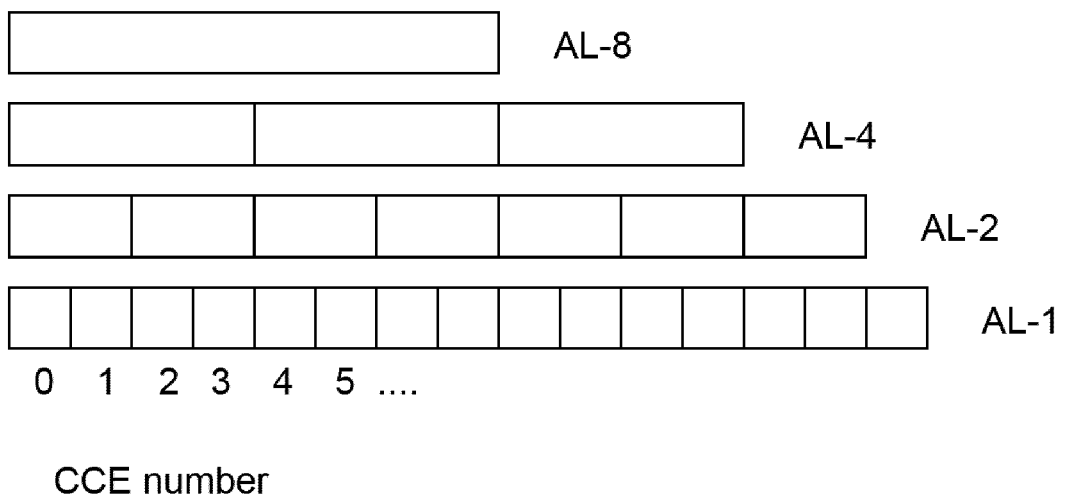
FIG. 4 is a block diagram of CCE aggregation.
Figure 5:
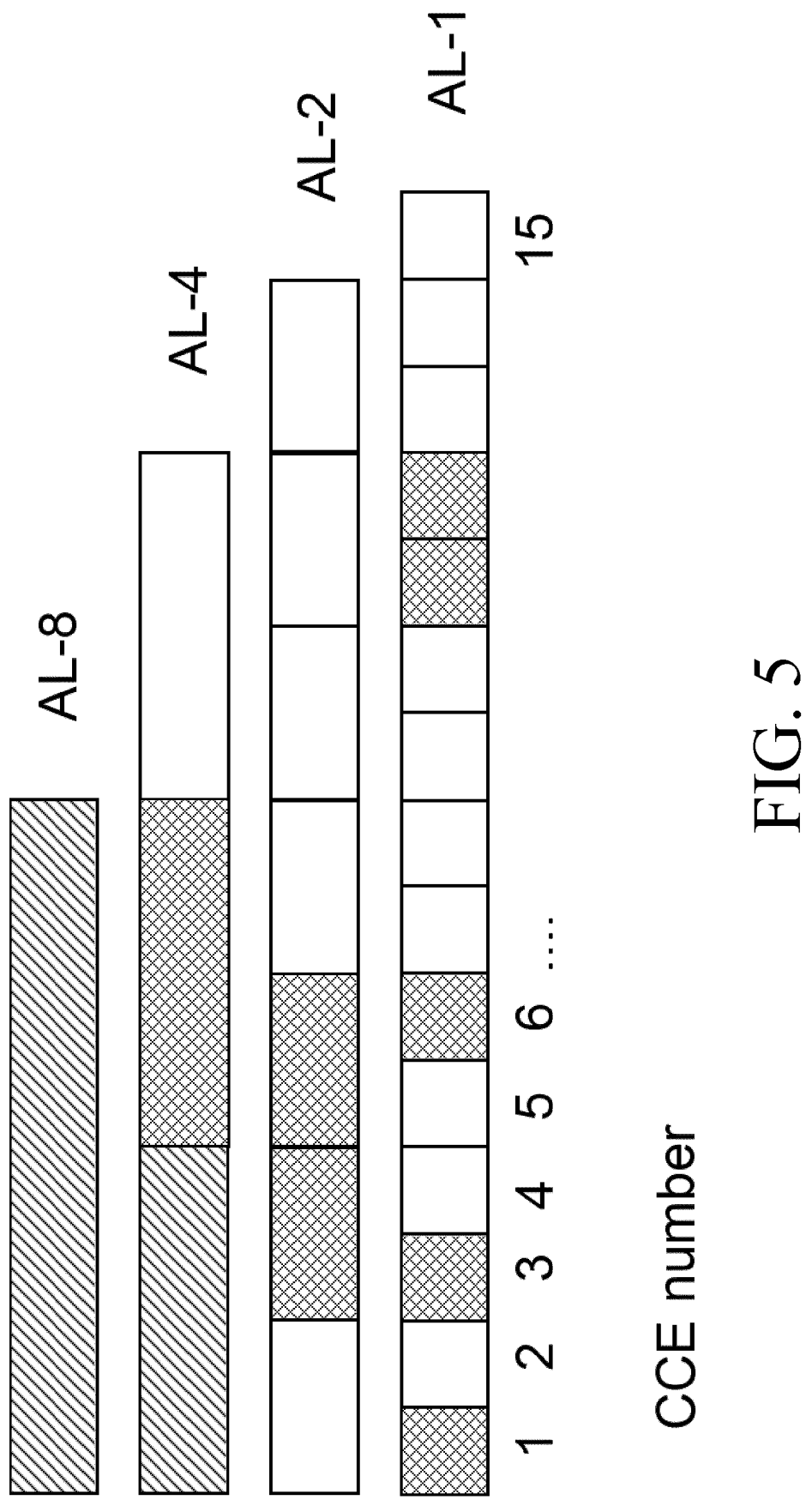
FIG. 5 is a block diagram showing a search space to be monitored by a wireless device.
Figure 6:
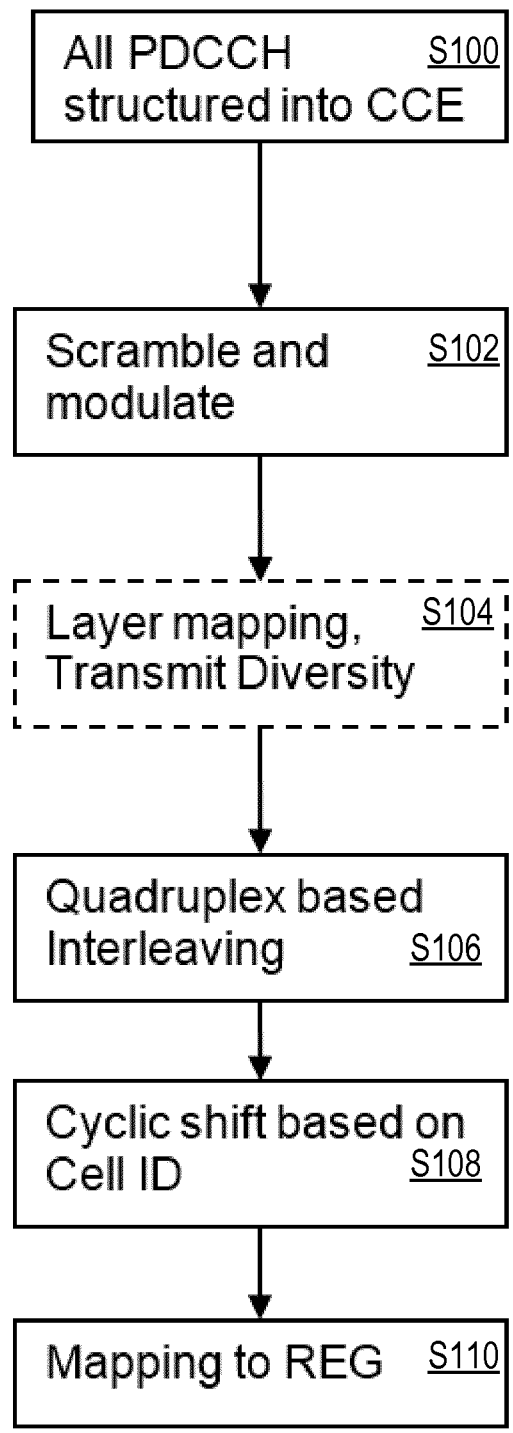
FIG. 6 is a flow diagram of processing steps for PDCCH formation.
Figure 7:
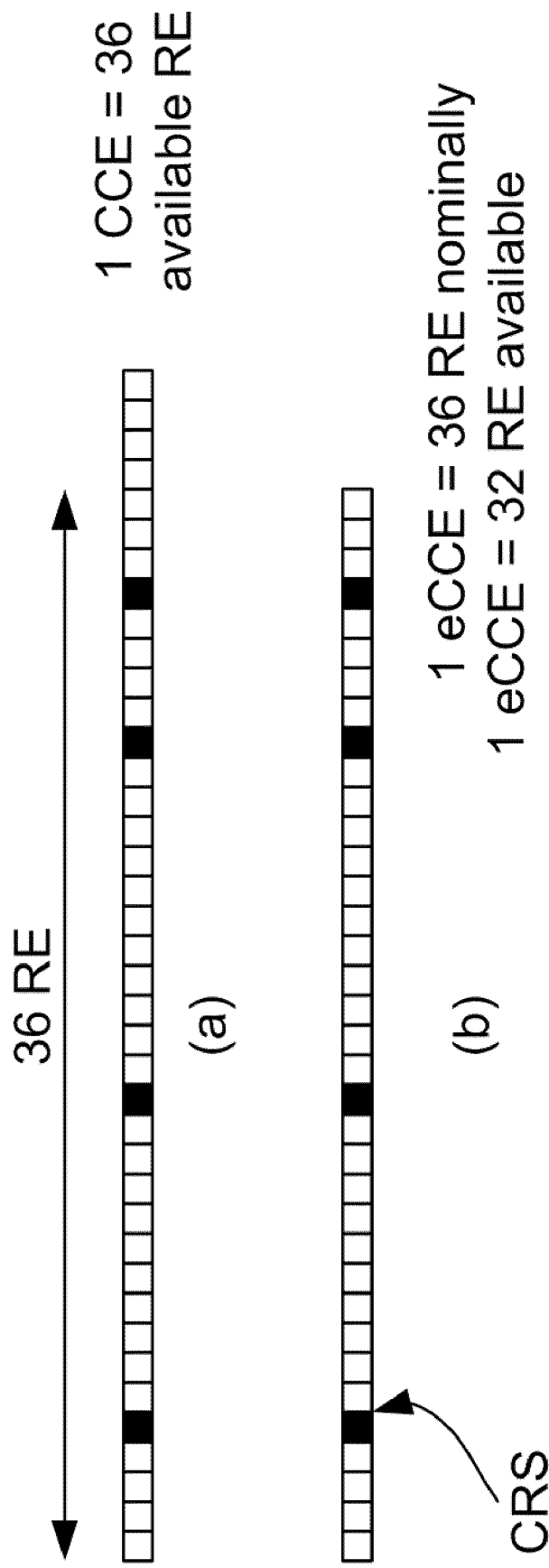
FIG. 7 is a block diagram that illustrates differences between a CCE and an eCCE.
Figure 8:
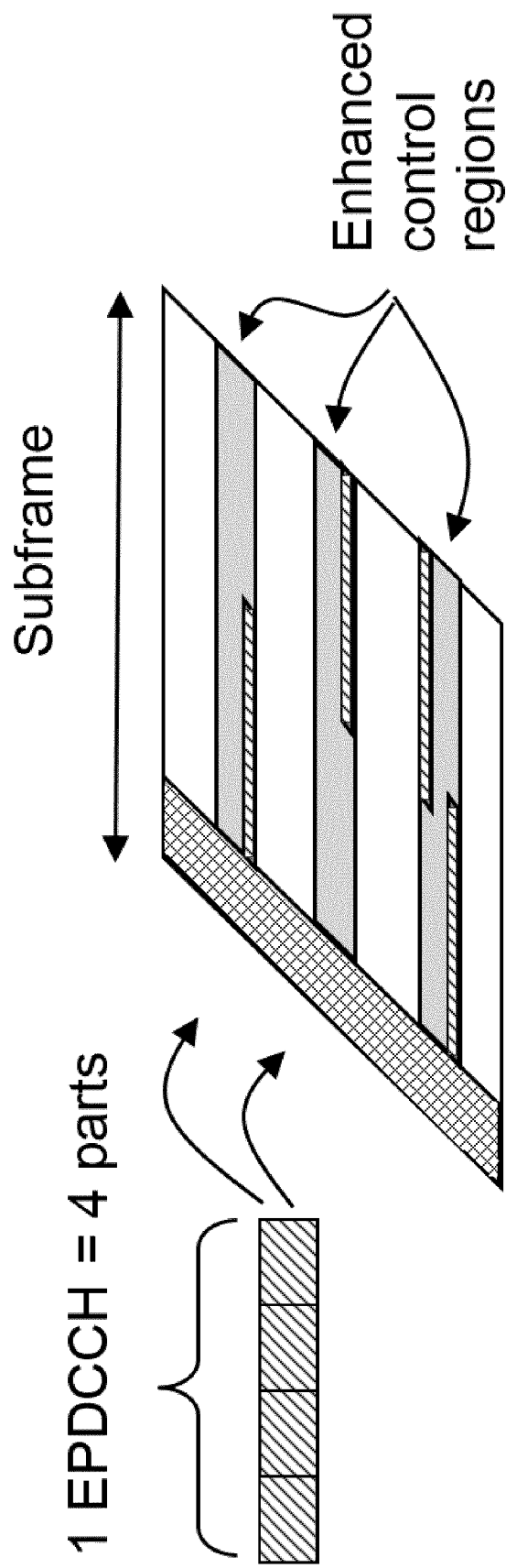
FIG. 8 is a block diagram of a downlink subframe having 4 parts belonging to an ePDCCH.

Before describing in detail exemplary embodiments, it is noted that the embodiments reside primarily in combinations of apparatus components and processing steps related to a method, network node and wireless device for dynamic short Physical Downlink Control Channel (sPDCCH) resources determination and modification. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. As used herein, a subslot corresponds to a short transmission time interval, sTTI, such that subslot and sTTI are used interchangeably. In some aspects, the short TTI may refer to a subslot or a slot duration transmission, i.e. subslot or slot TTI. A short TTI or subslot may alternatively be referred to as a mini-slot. In some examples, the short TTI has a duration of 1 to 7 OFDM symbols, or 0.5 ms or less. In some examples, the subslot or mini-slot has a duration of 1 to 6 OFDM symbols, e.g. 2 or 3 OFDM symbols. Any example of the disclosure may be considered as applicable to a short TTI, subslot, slot or mini-slot. Aspects of the disclosure may apply generally to a Physical Downlink Control Channel for (i.e. in) a short TTI, subslot or mini-slot.

Parameters of the DL control channel for short TTI, called sPDCCH (PDCCH for short TTI), are configured over higher layer signaling or pre-defined in the specification. One of such parameters is the number of OFDM symbols used for sPDCCH. Pre-configuration of the number of OFDM symbols for sPDCCH does not allow flexibility to change dynamically the sPDCCH transmission considering DMRS based transmission mode or high reference signal overhead.

The disclosure solves the problems with existing systems, in one or more embodiments, by using a different number of OFDM symbols for sPDCCH than the pre-configured/pre-defined value depending on the short TTI pattern in a subframe and/or depending on the reference signal overhead and/or depending on the configured transmission mode. Furthermore, methods described herein determine the PRBs used for sPDCCH among the set of configured PRBs. Also, a flexible mapping for sPDCCH to the resource elements (REs) is described in case of 3 OFDM symbol long sPDCCH. In one or more embodiments, the disclosure enables optimization of the sPDCCH transmission considering the actual duration of sTTI it is transmitted in and/or considering reference signal overhead.

Before describing in detail exemplary embodiments, it is noted that the embodiments reside primarily in combinations of apparatus components and processing steps related to dynamic short Physical Downlink Control Channel (sPDCCH) determination and modification. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Throughout the disclosure, it is assumed that sPDCCH parameters have been pre-configured over higher layer signaling such as RRC for LTE or pre-defined, e.g. in the LTE specifications. A typical sPDCCH parameter is the number of time resources, e.g. OFDM symbols, used for sPDCCH transmission. As an example, the pre-configured or pre-defined number of OFDM symbols (OS) for sPDCCH is two (2) in the following description. The disclosure describes cases where the default pre-configured or pre-defined number of OFDM symbols (OS) for sPDCCH is not applied. Continuing the example given above, in the cases listed below the number of OFDM symbols actually used for sPDCCH transmission needs to be increased to three (3). This affects other sPDCCH transmission characteristics such as the used frequency resources.

TTI length dependent (sTTI pattern dependent) control channel mapping

In one or more embodiments of the disclosure, a different number of frequency resources (e.g., PRBs) is used for sPDCCH depending on the number of time resources (e.g. OFDM symbols) used for sPDCCH transmission. In other words, in one or more embodiments, frequency resources for the sPDCCH is based on the time resources used for the sPDCCH. This is particularly useful in case of DMRS based transmissions with a RRC configured sTTI length of 2 OFDM symbols, i.e., 2 symbol sTTI or time duration. This may assume that for some sTTI within 1 ms subframe, the TTI length is actually 3 OFDM symbols instead of 2 OFDM symbols, as observed on the DL pattern depicted in FIG. 13. Hence, a 3 OFDM symbol sPDCCH is defined for the 3 OFDM symbol long sTTI. This allows beamforming flexibility as well as higher resource efficiency. In one or more embodiments, one or more sTTIs illustrated in FIG. 13 include a sPDCCH. In one or more embodiments, each sTTI (e.g., sTTI 0-5 or 0-4) illustrated in FIG. 13 includes a sPDCCH. Therefore, in one or more embodiments, the number of OFDM symbols for sPDCCH, i.e., control channel mapping or resources, is based at least on one characteristics associated with transmission such as the sTTI pattern or TTI length.

Figure 14:
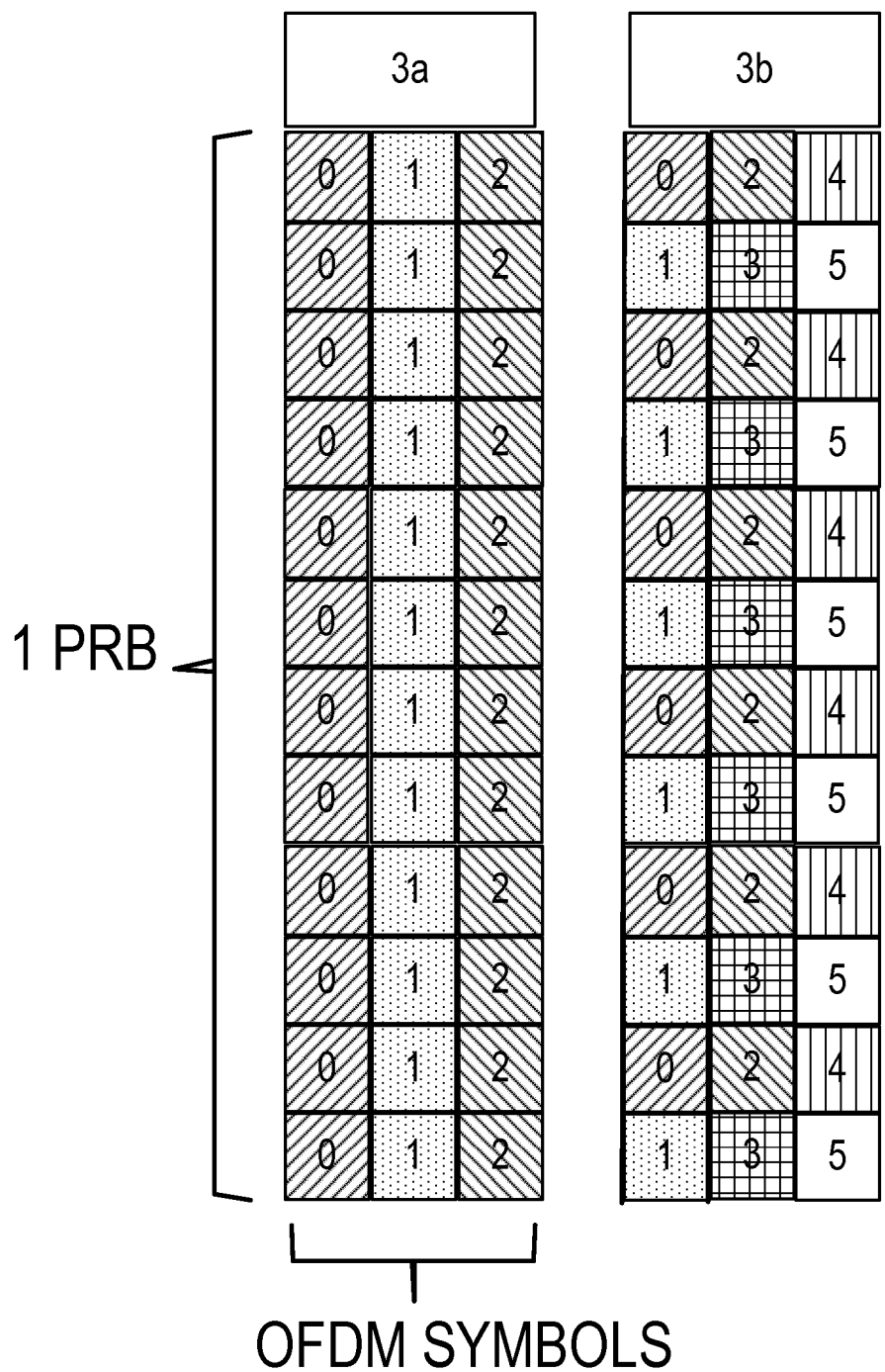
FIG. 14 is a block diagram of PRB based sREG (option a) and Fractioned PRB based sREG (option b) for 3 OFDM symbol sPDCCH.

In one embodiment, the third symbol can contain either one extra PRB based sREG of 12 REs or two extra fractioned PRB based sREG of 6 REs each, as illustrated in FIG. 14. Letters A-D, M and N indicate respective sREG groups.

3 symbol long sPDCCH use same PRBs as 2 symbol long sPDCCH

In one embodiment, the frequency resources (e.g. PRBs) used for a sCCE in case of a transmitted sPDCCH spanning 3 OFDM symbols are the same as the frequency resources (e.g. PRBs) used for a sCCE in case of a transmitted sPDCCH spanning 2 OFDM symbols. In other words, the frequency resources (e.g. PRBs) used for a sCCE in case of a transmitted sPDCCH are independent of the number of time resources (e.g. OFDM symbols) used by sPDCCH in a given TTI. They only depend on the preliminary RRC configuration.

Figure 10:
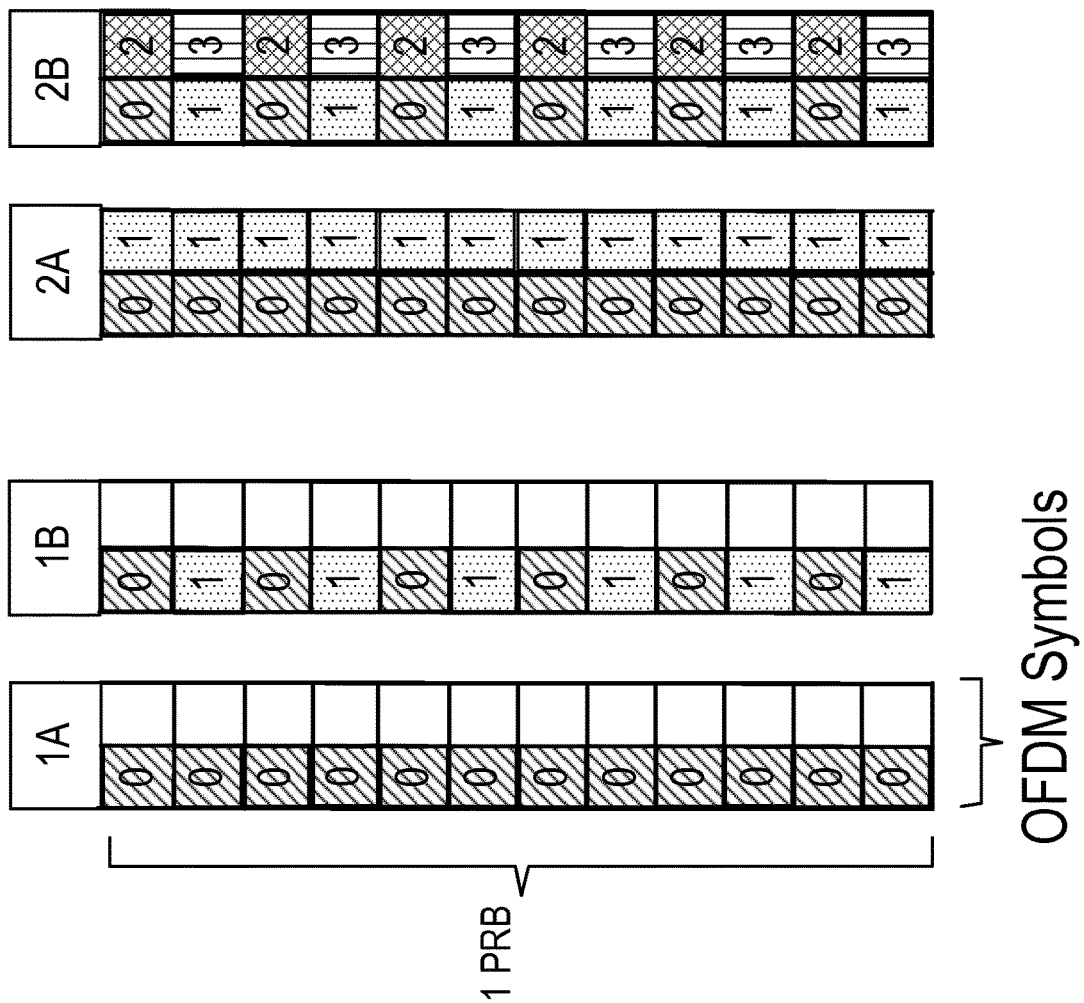
FIG. 10 is a block diagram of a PRB based sREG and a fractioned PRB based SREG for 1 OFDM symbol.

Comparing FIG. 14 and FIG. 10, the number of REs usable for sPDCCH in a 3 symbol sTTI is larger than in a 2 symbol sTTI. Consequently, this embodiment results in an increase of the number of REs per sCCE or in general for sPDCCH. For instance, if 2 PRBs build 1 sCCE with 2 symbol sTTI, it can be defined that using the same mapping those 2 PRBs build one sCCE with 3 symbol sTTI as well.

This embodiment is less resource-efficient. However, since it uses more resources per sCCE, it will increase the likelihood of correct sPDCCH decoding, due to the increased amount of information resources. Thereby, the network node can schedule the wireless device with a lower aggregation level, or the maximum aggregation level that the UE should monitor could be reduced in sTTI with sPDCCH length 3 symbols.

It has also the advantage to make the handling of sPDCCH resources for wireless devices easier, since the number of resources for a given aggregation level does not depend on the location of the sTTI in a subframe. As soon as the wireless device is RRC configured with a given TTI length and sPDCCH configuration parameters, the wireless device knows that the PRBs to search sPDCCH in for a given aggregation level is the same in all sTTIs.

3 Symbol Long sPDCCH Uses Optimized Number of PRBs

In another embodiment, the frequency resources (e.g. PRBs) used for a sCCE in case of a transmitted sPDCCH may be optimized depending on the number of time resources (e.g. OFDM symbols) used by sPDCCH. This signifies that the frequency resources (e.g. PRBs) used for a sCCE in case of a transmitted sPDCCH spanning 3 OFDM symbols may be different from the frequency resources (e.g., PRBs) used for a sCCE in case of a transmitted sPDCCH spanning 2 OFDM symbols. In other words, in one or more embodiments, the frequency resources for the sPDCCH are based on the time resources for the sPDCCH.

Here the intention is to maintain the same number of REs/sCCEs. Since a PRB will contain more REs for a 3 symbol long sPDCCH compared to a 2 symbol long sPDCCH, the number of PRBs for 3 symbol long sPDCCH is then smaller than the number of PRBs for 2 symbol long sPDCCH. If a distributed sCCE to REs mapping is applied, a smaller number of PRBs is also used with 3 symbol sPDCCH compared to 2 symbol sPDCCH. As further described below, the 3 OFDM symbol sPDCCH localized scheme and 3 OFDM symbol sPDCCH distributed scheme show the aforementioned comparison.

So, in this embodiment, a wireless device/network node adapts the sPDCCH mapping, i.e., modification of preconfigured resources, according to the duration of the transmitted sPDCCH, i.e., an example of a characteristics associated with transmission. The RRC configuration alone is not sufficient. Although the same sPDCCH related parameters are configured over RRC, the frequency resources used for sPDCCH are determined also by the number of OFDM symbols in the transmitted sPDCCH.

3 OFDM Symbol sPDCCH Localized Scheme with Optimized Use of Number of PRBs

Figure 9:
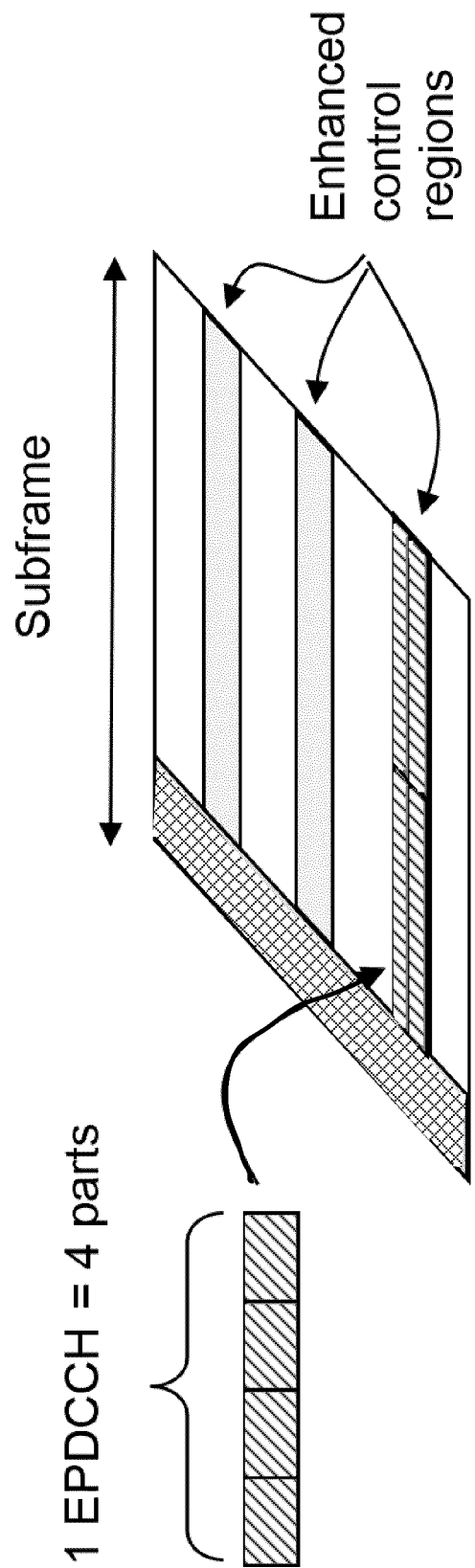
FIG. 9 is a block diagram of a downlink subframe showing a different mapping of 4 eCCEs.
Figure 15:
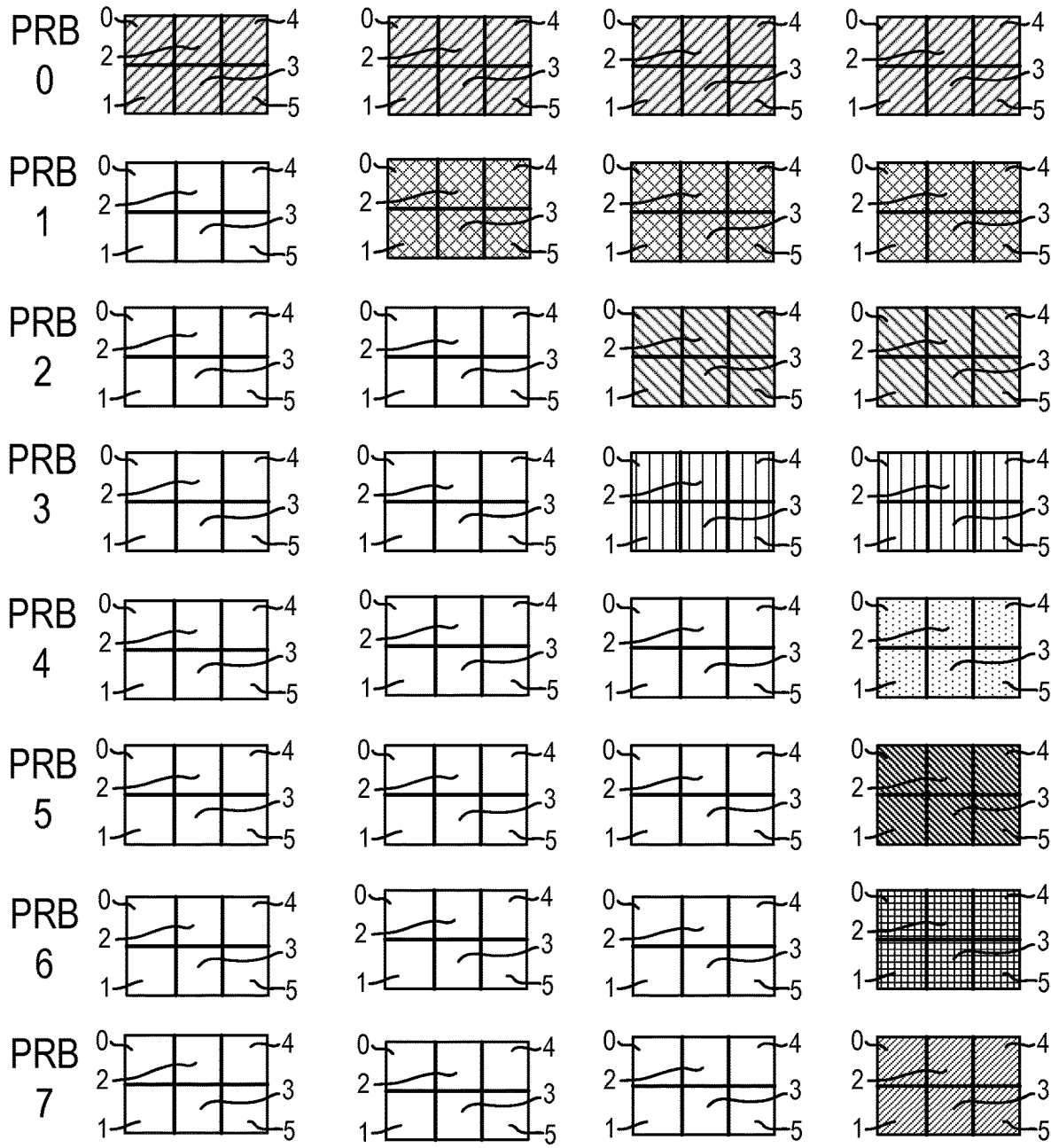
FIG. 15 is a block diagram of 3-OFDM symbol sPDCCH localized scheme.

For the localized scheme, the sREGs building the same sCCE are localized in frequency domain, i.e. in consecutive PRBs. This allows a sPDCCH resource allocation confined in a limited frequency band as well as to facilitate the use of beamforming for DMRS-based sPDCCH. Based on this, and as an embodiment of the disclosure, the localized cases are defined up to an aggregation level of 8 (i.e. up to 8 sCCE per sPDCCH) and illustrated in FIG. 9. Each color represents one sCCE. This embodiment further comprises that the unused PRBs shown in FIG. 9 can be further assigned for building other sCCE for other UEs as well as the possibility to be used for sPDSCH allocation. The PRB index showed in FIG. 15 represents the number within the sPDCCH PRB set. For simplicity, the physical PRB number is not shown though. This applies for PRB based sREG as well as fractioned PRB based sREG. Letters E-L indicate respective sCCEs.

Figure 12:
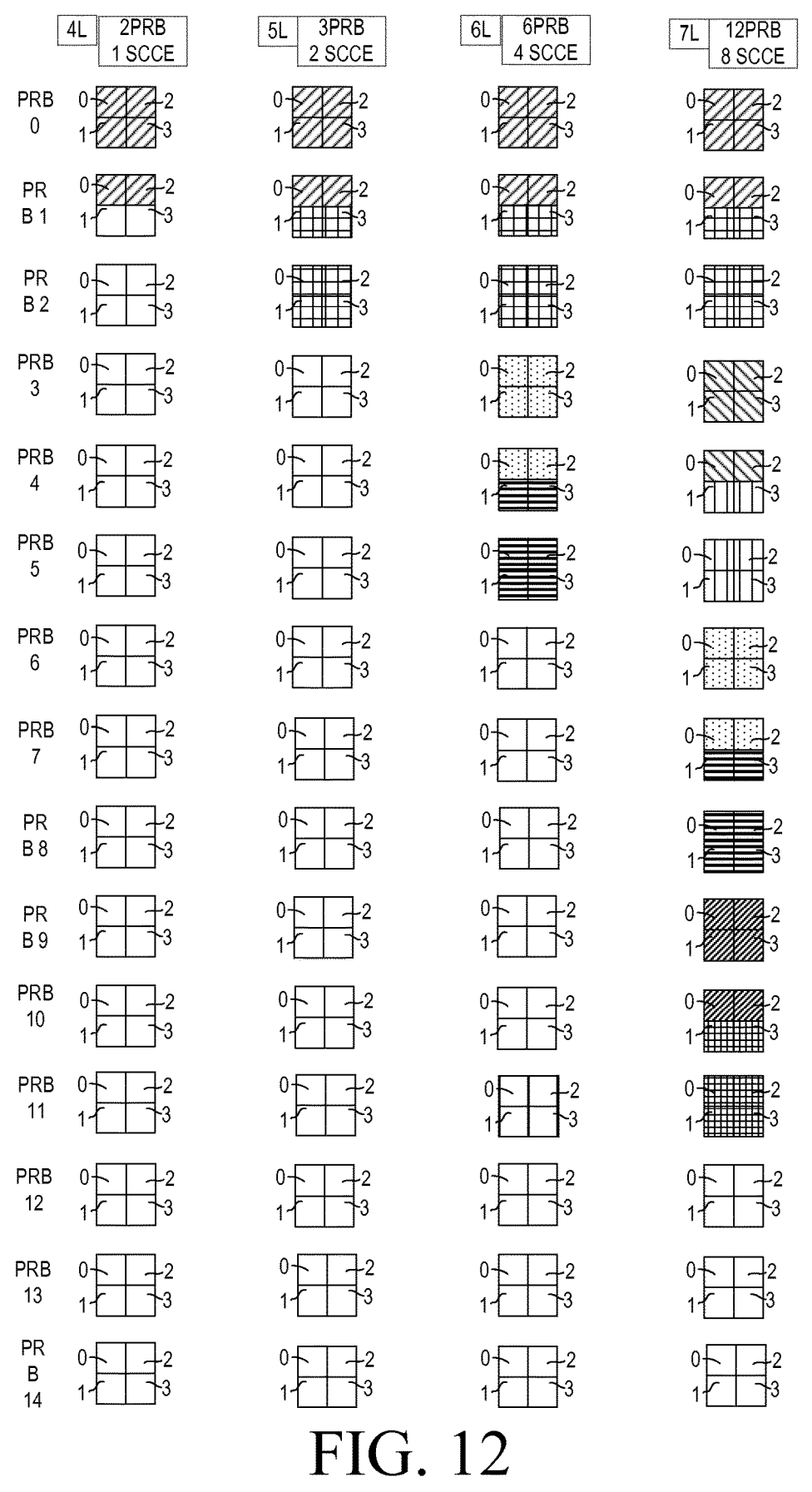

For instance, as observed in FIG. 15, 1 sCCE of 36 REs is built with only one full PRB along 3 OFDM symbols, unlike 2 PRBs which are needed with 2 OFDM symbols (see FIG. 12, case 4L).

3 OFDM Symbol sPDCCH Distributed Scheme with Optimized Use of Number of PRBs

Figure 16:
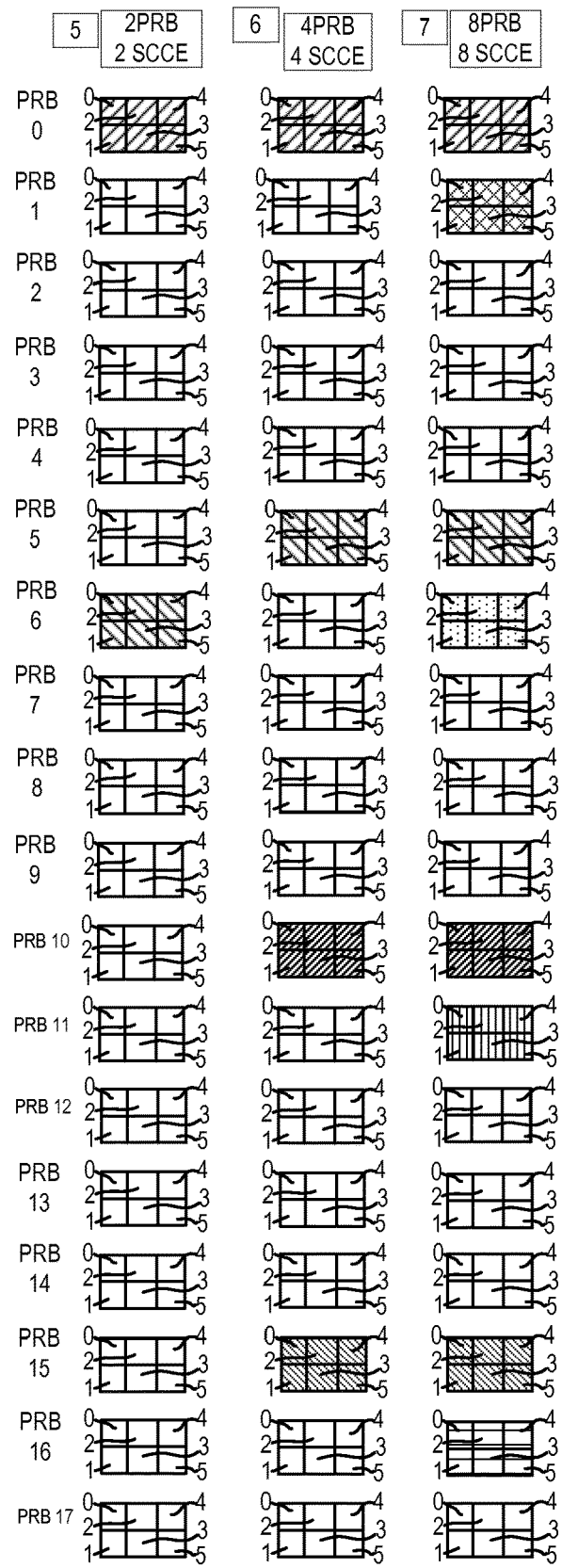
FIG. 16 is a block diagram of 3-OFDM symbol sPDCCH distributed scheme.

As a further embodiment of the disclosure, the distributed cases with 3 OFDM symbol sPDCCH are depicted in FIG. 16. Letters E-L indicate respective sCCEs. These cases comprise a regular distribution in frequency domain and an aggregation level of up to 8 (i.e. up to 8 sCCE per sPDCCH). This embodiment further comprises that the unused PRBs shown in FIG. 16 can be further assigned for building other sCCE for other wireless devices as well as the possibility to be used for sPDSCH allocation. The PRB index showed in FIG. 16 represents the number within the sPDCCH PRB set (for this example, a set of 18 PRBs). For simplicity, the physical PRB number is not shown though. This applies for PRB based sREG as well as fractioned PRB based sREG.

Figure 11:
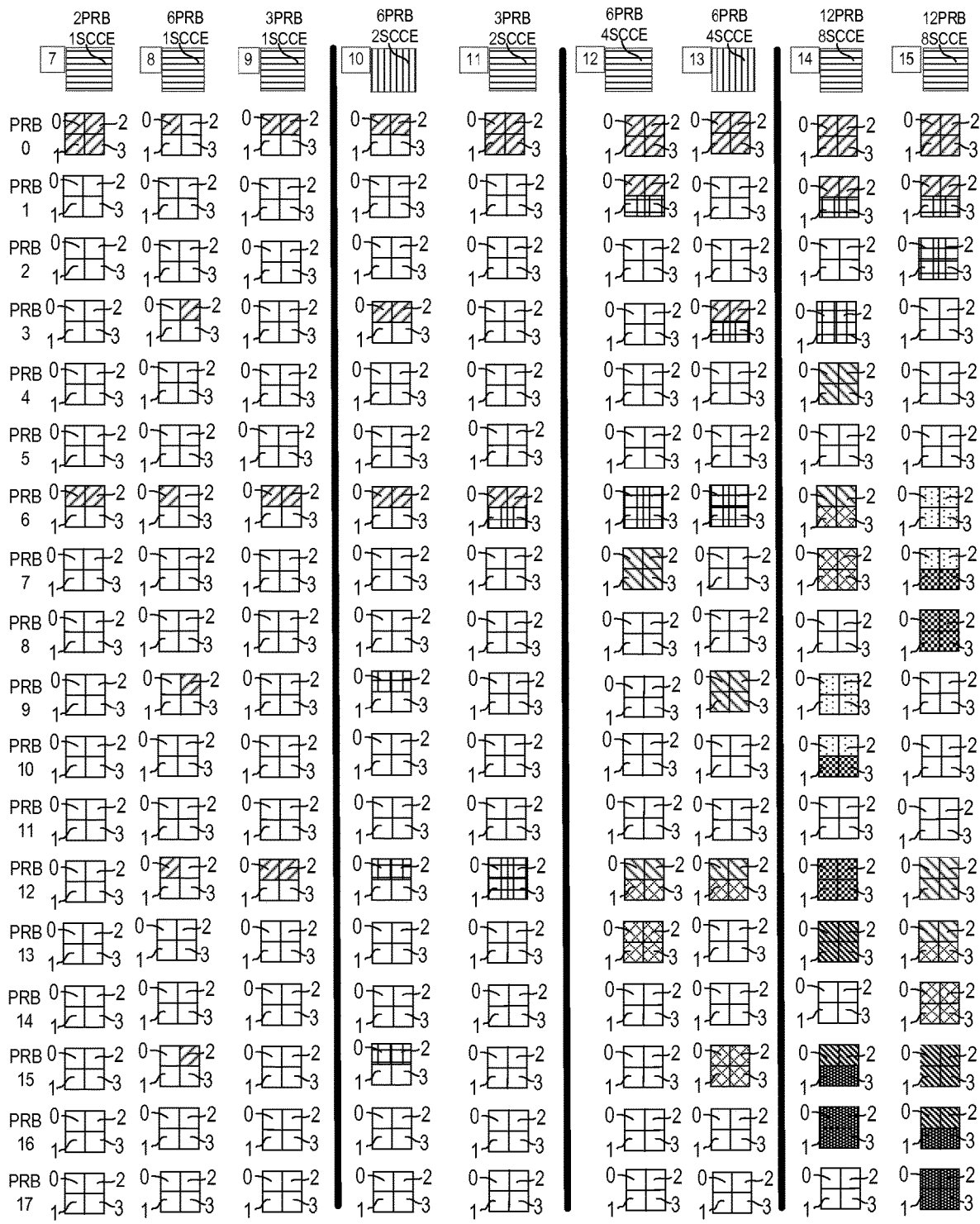
FIG. 11 is a block diagram of 2-OFDM symbol sPDCCH distributed scheme for a set of 18 PRBs.

For instance, as observed in FIG. 16, 2 sCCE of 36 REs each is built with only two full PRB along 3 OFDM symbols, unlike 3 PRBs which are needed with 2 OFDM symbols (see FIG. 11, case 11).

3 OFDM Symbol sPDCCH to Reduce Reference Signal Overhead

Figure 17:
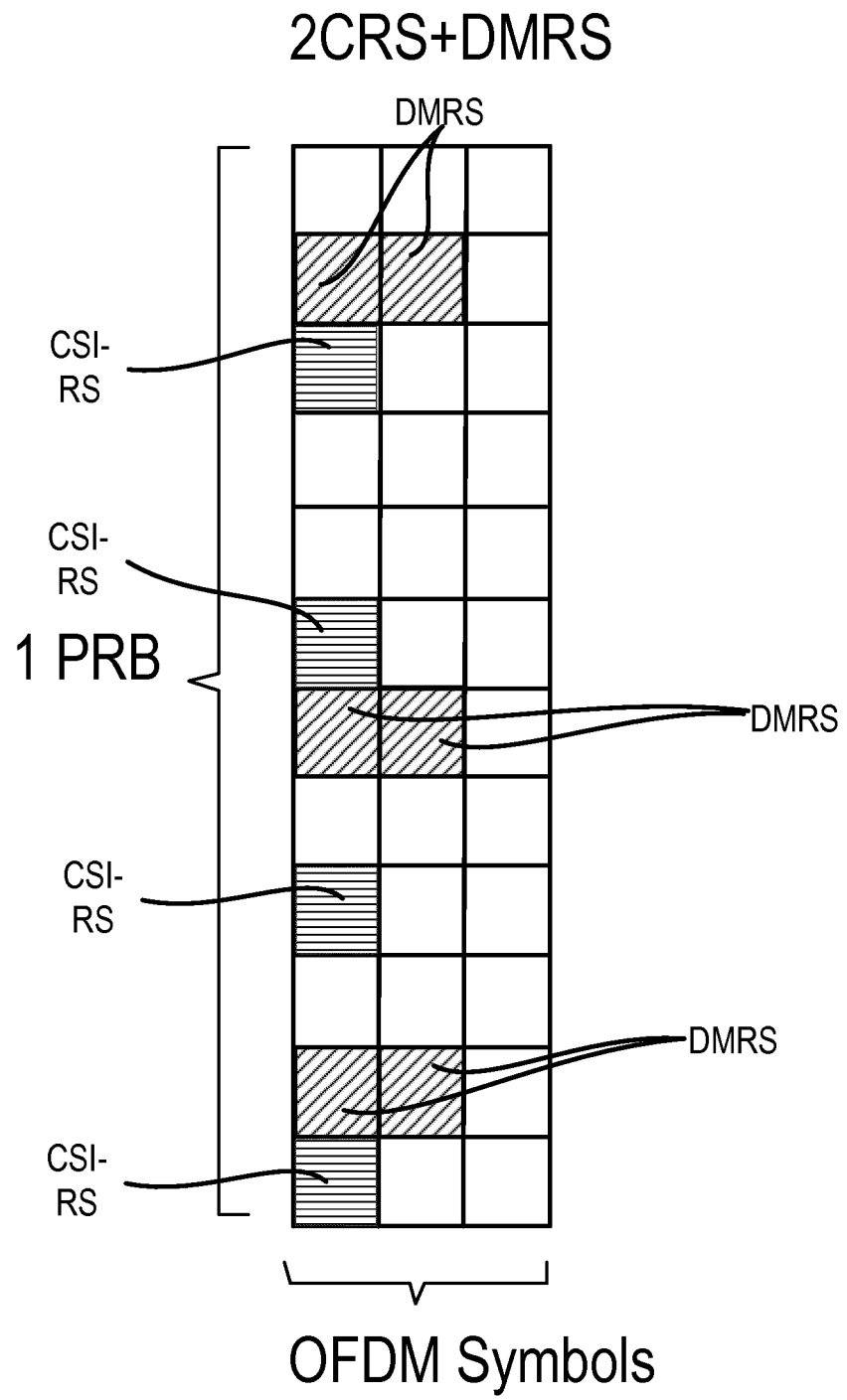
FIG. 17 is a block diagram of an example of a PRB with RE occupied by reference signals: DMRS and CSI-RS.

In this embodiment, a default number of OFDM symbols, i.e., time resources, used for sPDCCH is either configured over higher layer signaling, e.g. RRC in LTE or pre-defined, e.g. in the LTE specifications. In other words, in one or more embodiments, the number of OFDM symbols for sPDCCH, i.e., control channel mapping or resources, is based at least on reference signal overhead. But for some cases, depending on the transmission mode (e.g. DMRS-based) and/or the presence of special reference signals (e.g. CSI-RS, DMRS), many REs within a PRB are occupied by such signals. In other words, in one or more embodiments, the number of OFDM symbols for sPDCCH is based at least on the transmission mode. An example is depicted in FIG. 17, wherein the reference signals represent 42% overhead within 2 OFDM symbols. If a 2 OFDM symbol sPDCCH is configured and its sCCE are made up with 2 symbol long PRBs containing such colliding signals, the number of available REs per sCCE will be less than a target number of REs per sCCE, e.g. 36 REs. Based on this, in one further embodiment of the disclosure, a 3 OFDM symbol sPDCCH is used for slot sTTI for those cases with only few REs available per PRB due to reference signals and other kind of overhead. As shown in FIG. 17, the third OFDM symbol will include up to 12 extra available REs per PRB and therefore per sCCE. This comprises both localized and distributed scheme cases. This embodiment is particularly useful in case of a short TTI of length 7os, where it is possible to increase the length of sPDCCH from 2 to 3 OFDM symbols.

This embodiment can be summarized as follows. Depending on the transmission mode configured for a wireless device and/or the presence of special reference signals known to the wireless device (e.g., DMRS, CSI-RS) the number of time resources used for sPDCCH (implicitly) increases compared to a pre-defined or pre-configured setting, e.g. sPDCCH spans 3 OS instead of 2. Therefore, in one or more embodiments, the number of OFDM symbols for sPDCCH, i.e., control channel mapping or resources, is based at least on reference signal overhead and/or a transmission mode for wireless device 44, i.e., based on one or more characteristics associated with transmission.

While embodiments have been described separately, one or more embodiments described herein may be used together such that a number of OFDM symbols for sPDCCH may be based on one or more of characteristics associated with transmission such as TTI length (TTI pattern), reference signal overhead and configured transmission mode. In one or more embodiments described herein, the channel mapping or resources correspond to an increase in resource such as time resources from 2 OFDM symbols to 3 OFDM symbols.

Figure 18:
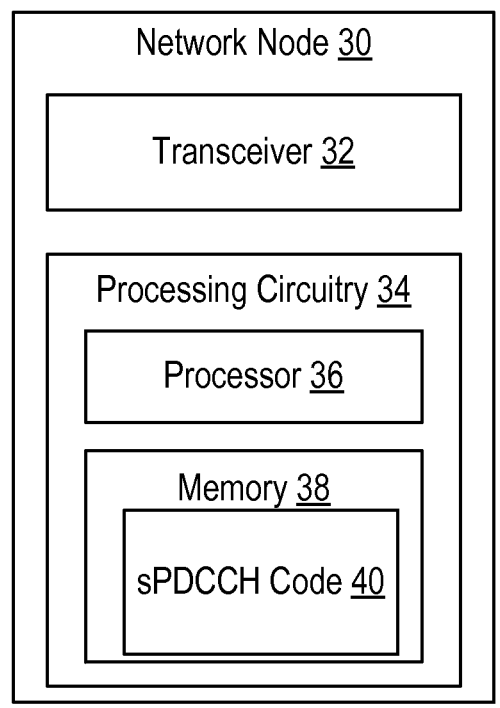
FIG. 18 is a block diagram of an exemplary network node in accordance with the principles of the disclosure.

FIG. 18 is a block diagram of network node 30 for dynamic short Physical Downlink Control Channel (sPDCCH) determination for configuring wireless device 44 such as via a transmission grant in accordance with the principles of the disclosure. The network node includes one or more transceivers 32 for communicating with one or more wireless devices, other network nodes and/or other entities, as described herein. Network node 30 includes processing circuitry 34. In some embodiments, processing circuitry 34 includes a memory 38 and processor 36, the memory 38 containing instructions which, when executed by the processor 36, configure processor 36 to perform the one or more functions described herein. In addition to a traditional processor and memory, processing circuitry 34 may comprise integrated circuitry for processing and/or control, e.g., one or more processors and/or processor cores and/or FPGAs (Field Programmable Gate Array) and/or ASICs (Application Specific Integrated Circuitry).

Processing circuitry 34 may include and/or be connected to and/or be configured for accessing (e.g., writing to and/or reading from) memory 38, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by control circuitry and/or other data, e.g., data pertaining to communication, e.g., configuration and/or address data of nodes, etc. Processing circuitry 34 may be configured to control any of the methods described herein and/or to cause such methods to be performed, e.g., by processor 36. Corresponding instructions may be stored in the memory 38, which may be readable and/or readably connected to the processing circuitry 34. In other words, processing circuitry 34 may include a controller, which may comprise a microprocessor and/or microcontroller and/or FPGA (Field-Programmable Gate Array) device and/or ASIC (Application Specific Integrated Circuit) device. It may be considered that processing circuitry 34 includes or may be connected or connectable to memory, which may be configured to be accessible for reading and/or writing by the controller and/or processing circuitry 34.

In one or more embodiments, memory 38 is configured to store sPDCCH code 40. For example, sPDCCH code 40 includes instructions that, when executed by processor 36, causes processor 36 to perform the signaling describe herein with respect to network node 30.

The term "network node" or "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 19:
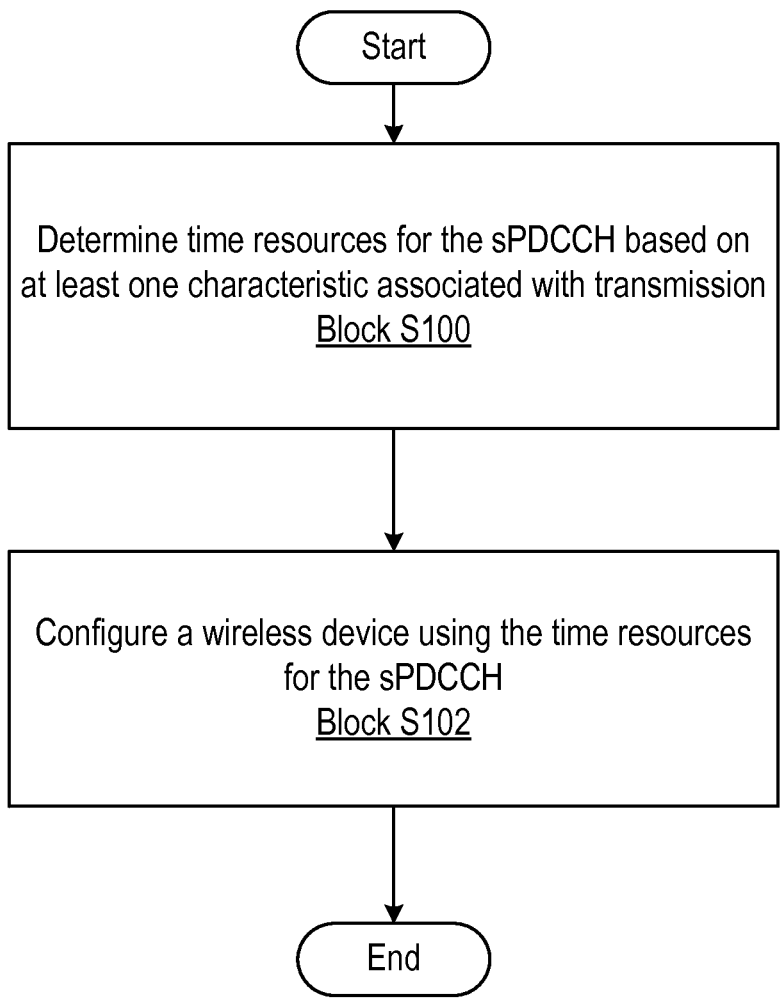
FIG. 19 is a flow diagram of an exemplary sPDCCH modification process in accordance with the principles of the disclosure.

FIG. 19 is a flow diagram of an exemplary embodiment of sPDCCH code 40 in accordance with the principles of the disclosure. Processing circuitry 34 is configured to determine time resources for the sPDCCH based on at least one characteristic associated with transmission, as described herein (Block S100). Processing circuitry 34 is configured to configure a wireless device 44 using the time resources for the sPDCCH, as described herein (Block S102). For example, configuring wireless device 44 may include transmitting a scheduling grant and/or assignment to wireless device 44. In one or more embodiments, the scheduling grant and/or assignment is for uplink transmission and/or downlink reception by wireless device 44.

In one or more embodiments, processing circuitry 34 is configured to at least one of determine sPDCCH time resources associated with the wireless device and determine sPDCCH frequency resources associated with the wireless device, as described herein. In one or more embodiments, processing circuitry 34 is configured to transmit a grant using the at least one of the sPDCCH time resources and sPDCCH frequency resources, to the wireless device 44 for configuring or scheduling the wireless device 44, as described herein.

Figure 20:
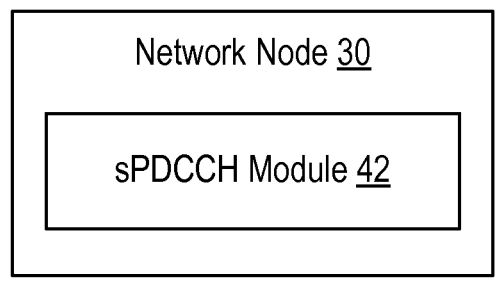
FIG. 20 is a block diagram of another embodiment of network node in accordance with the principles of the disclosure.

FIG. 20 is a block diagram of an alternative embodiment of network node 30 in accordance with the principles of the disclosure. Network node 30 includes sPDCCH module 42 for performing functions as described for sPDCCH code 40.

Figure 21:
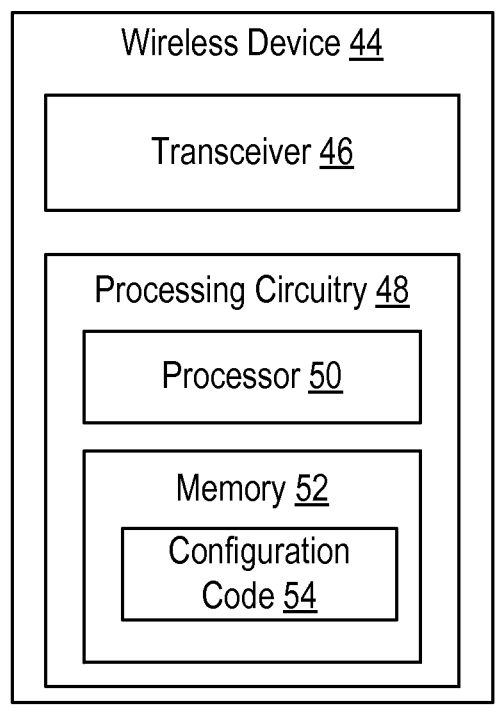
FIG. 21 is a block diagram of an exemplary embodiment of wireless device in accordance with the principles of the disclosure.

FIG. 21 is a block diagram of wireless device 44 in accordance with the principles of the disclosure. Wireless device 44 includes transceiver 46 that is configured to communicate with network node 30, other wireless devices 44 and/or other entities, as descried herein. Wireless device 44 includes processing circuitry 48. In some embodiments, processing circuitry 48 includes a memory 52 and processor 50, the memory 52 containing instructions which, when executed by the processor 50, configure processor 50 to perform the one or more functions described herein. In addition to a traditional processor and memory, processing circuitry 48 may comprise integrated circuitry for processing and/or control, e.g., one or more processors and/or processor cores and/or FPGAs (Field Programmable Gate Array) and/or ASICs (Application Specific Integrated Circuitry).

Processing circuitry 48 may include and/or be connected to and/or be configured for accessing (e.g., writing to and/or reading from) memory 52, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 52 may be configured to store code executable by control circuitry and/or other data, e.g., data pertaining to communication, e.g., configuration and/or address data of nodes, etc. Processing circuitry 48 may be configured to control any of the methods described herein and/or to cause such methods to be performed, e.g., by processor 50. Corresponding instructions may be stored in the memory 52, which may be readable and/or readably connected to the processing circuitry 34. In other words, processing circuitry 48 may include a controller, which may comprise a microprocessor and/or microcontroller and/or FPGA (Field-Programmable Gate Array) device and/or ASIC (Application Specific Integrated Circuit) device. It may be considered that processing circuitry 48 includes or may be connected or connectable to memory, which may be configured to be accessible for reading and/or writing by the controller and/or processing circuitry 48.

In one or more embodiments, memory 52 is configured to store configuration code 54. For example, configuration code 54 includes instructions that, when executed by processor 50, causes processor 50 to perform the configuration of sPDCCH parameters as described herein. Wireless device 44 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 22:
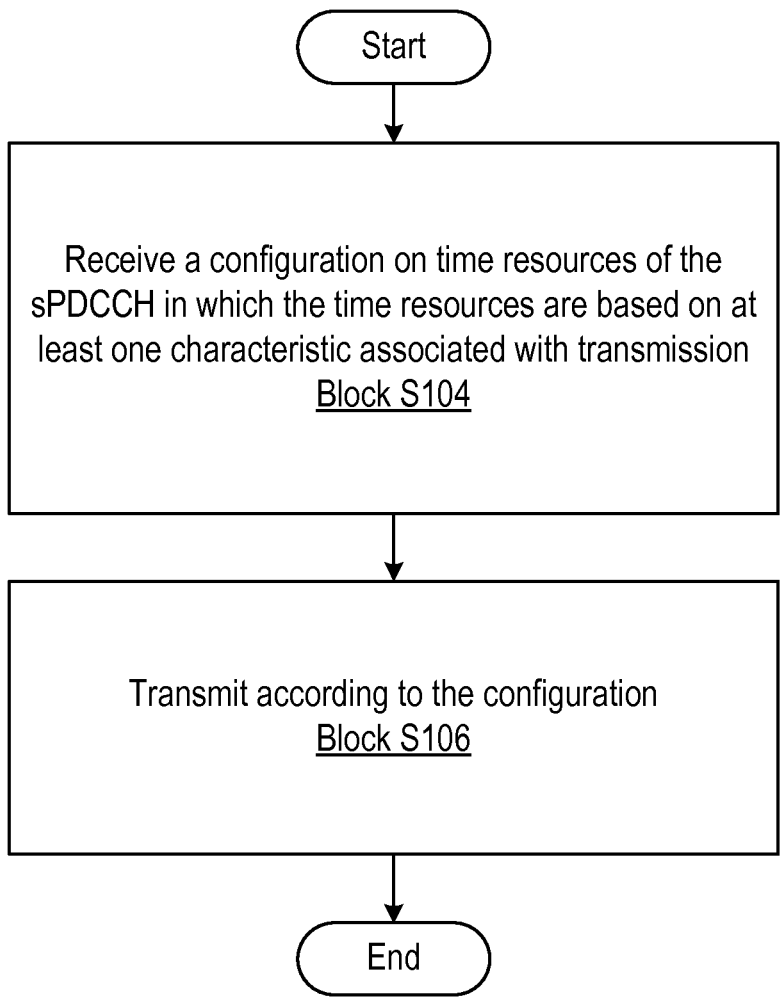
FIG. 22 is a flow diagram of an exemplary configuration process in accordance with the principles of the disclosure.

FIG. 22 is a flow diagram of an exemplary configuration process of configuration code 54. Processing circuitry 48 is configured to receive a configuration on time resources for the sPDCCH in which the time resources being based on at least one characteristic associated with transmission, as described herein (Block S104). Processing circuitry 48 is configured to transmit according to the configuration, as described herein (Block S106).

In one or more embodiments, processing circuitry 48 is configured to at least one of receive sPDCCH time resources associated with the wireless device and sPDCCH frequency resources associated with the wireless device, as described herein. In one or more embodiments, processing circuitry 48 is configured to transmit according to a transmission configuration or scheduling received in the at least one of the sPDCCH time resources and the sPDCCH frequency resources, as described herein.

Figure 23:
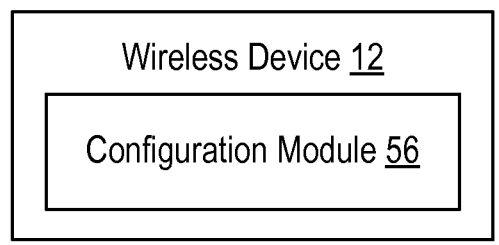
FIG. 23 is a block diagram of another embodiment of wireless device in accordance with the principles of the disclosure.

FIG. 23 is an alternative embodiment of wireless device 44 in accordance with the principles of the disclosure. Wireless device 44 includes configuration module 56 for performing functions as described above for configuration code 54.

One or more embodiments of the disclosure include:

Embodiment 1

A method for transmitting grant for resources (sPDCCH) to a wireless device 44, the method being performed by a network node 30, the method comprising:
Determining a number/quantity of time resources for the grant transmission
   Wherein the determined number of time resources for the grant transmission may be different than a pre-configured or pre-defined number of time resources for the grant transmission
Determining the frequency resources for the grant transmission
Transmitting the grant for resources to the wireless device 44,
   wherein the grant comprises an indicator indicating data resources allocated to the wireless device in a data channel Embodiment 2

The method of Embodiment 1, where the number of time resources for the grant transmission is determined considering the reference signal overhead or other type of overhead known to both the network node 30 and the wireless device 44.

Embodiment 3

Figure 13:
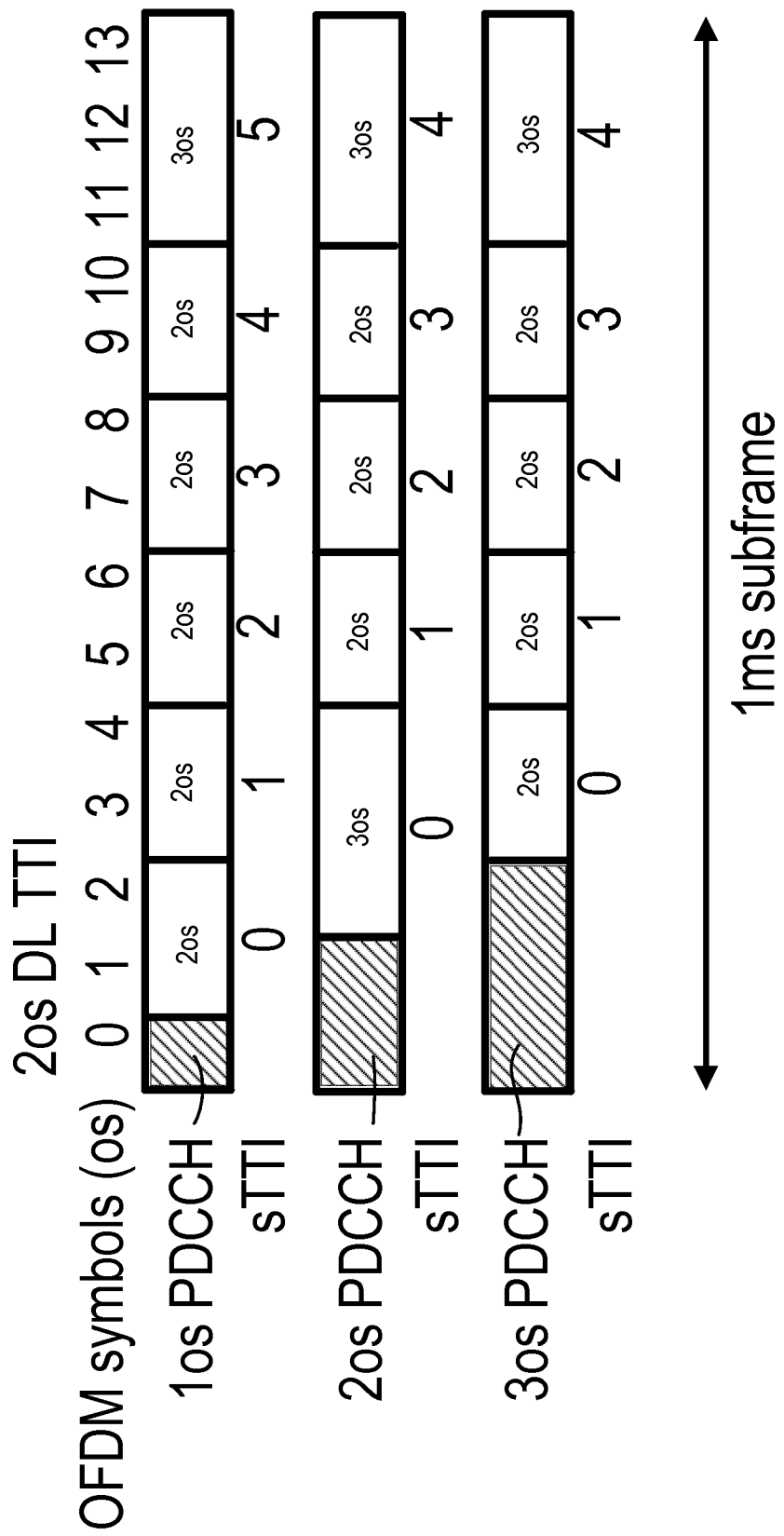
FIG. 13 is a block diagram of sTTIs in DL subframe for 2 OFDM symbol sTTI and different PDCCH lengths.

The method of Embodiment 1, where the number of time resources for the grant transmission is determined based on a pre-defined or pre-configured pattern of transmission duration (referring to example in FIG. 13).

Embodiment 4

The method of Embodiment 1, where the number of time resources for the grant transmission is determined based on a configured transmission mode for data channel and/or grant.

Embodiment 5

The method of any of Embodiments 1 to 4, where the frequency resources for the grant transmission are determined based on the pre-configured or pre-defined number of time resources for the grant transmission (e.g., 3 symbol long sPDCCH use same PRBs as 2 symbol long sPDCCH).

Embodiment 6

The method of any of Embodiments 1 to 4, where the frequency resources for the grant transmission are determined based on the determined number of time resources for the grant transmission (e.g., 3 symbol long sPDCCH uses optimized number of PRBs).

One or more other embodiments includes:

According to one aspect of the disclosure, a network node 30 for configuring sPDCCH resources for a wireless device 44 is provided. The network node 30 includes processing circuitry 34 configured to: at least one of determine a modification of sPDCCH time resources associated with the wireless device 44 and determine a modification of sPDCCH frequency resources associated with the wireless device 44, and transmit a grant for the at least one of the modification of sPDCCH time resources and the modification of sPDCCH frequency resources, to the wireless device 44.

According to one embodiment of this aspect, the modification of sPDCCH time resources associated with the wireless device 44 includes modifying the sPDCCH time resources from a predefined quantity of sPDCCH time resources to another number of sPDCCH time resources. According to one embodiment of this aspect, the modification of sPDCCH time resources associated with the wireless device 44 is based on a reference signal overhead. According to one embodiment of this aspect, the modification of sPDCCH time resources associated with the wireless device 44 is based on a predefined pattern of short transmission time interval (sTTI) durations.

According to one embodiment of this aspect, the modification of sPDCCH time resources associated with the wireless device 44 is based on a transmission mode for at least one of a data channel and a grant, for the wireless device 44. According to one embodiment of this aspect, the modification of sPDCCH frequency resources associated with the wireless device 44 is based on the determined modification of sPDCCH time resources. According to one embodiment of this aspect, the modification of sPDCCH frequency resources associated with the wireless device 44 is based on a predefined number of sPDCCH time resources associated with the wireless device 44.

According to one aspect of the disclosure, a method for network node 30 for configuring sPDCCH resources for a wireless device 44 is provided. A modification of sPDCCH time resources associated with the wireless device 44 is determined. A modification of sPDCCH frequency resources associated with the wireless device 44 is determined. A grant for the modification of sPDCCH time resources and the modification of sPDCCH frequency resources, is transmitted to the wireless device 44.

According to one embodiment of this aspect, the modification of sPDCCH time resources associated with the wireless device 44 includes modifying the sPDCCH time resources from a predefined number of sPDCCH time resources to another number of sPDCCH time resources. According to one embodiment of this aspect, the modification of sPDCCH time resources associated with the wireless device 44 is based on a reference signal overhead. According to one embodiment of this aspect, the modification of sPDCCH time resources associated with the wireless device 44 is based on a predefined pattern of short transmission time interval (sTTI) durations.

According to one embodiment of this aspect, the modification of sPDCCH time resources associated with the wireless device 44 is based on a transmission mode for at least one of a data channel and a grant, for the wireless device 44. According to one embodiment of this aspect, the modification of sPDCCH frequency resources associated with the wireless device 44 is based on the determined modification of sPDCCH time resources. According to one embodiment of this aspect, the modification of sPDCCH frequency resources associated with the wireless device 44 is based on a predefined number of sPDCCH time resources associated with the wireless device 44.

According to one aspect of the disclosure, a wireless device 44 for transmitting on sPDCCH resources is provided. The wireless device 44 includes processing circuitry 48 configured to at least one of receive a modification of sPDCCH time resources associated with the wireless device 44 and receive a modification of sPDCCH frequency resources associated with the wireless device 44, and transmit using the at least one of the modification of sPDCCH time resources and the modification of sPDCCH frequency resources.

According to one embodiment of this aspect, the modification of sPDCCH time resources associated with the wireless device 44 includes modifying the sPDCCH time resources from a predefined quantity of sPDCCH time resources to another number of sPDCCH time resources. According to one embodiment of this aspect, the modification of sPDCCH time resources associated with the wireless device 44 is based on a reference signal overhead. According to one embodiment of this aspect, the modification of sPDCCH time resources associated with the wireless device 44 is based on a predefined pattern of short transmission time interval (sTTI) durations.

According to one embodiment of this aspect, the modification of sPDCCH time resources associated with the wireless device 44 is based on a transmission mode for at least one of a data channel and a grant, for the wireless device 44. According to one embodiment of this aspect, the modification of sPDCCH frequency resources associated with the wireless device 44 is based on the determined modification of sPDCCH time resources. According to one embodiment of this aspect, the modification of sPDCCH frequency resources associated with the wireless device 44 is based on a predefined number of sPDCCH time resources associated with the wireless device 44.

According to one aspect of the disclosure, a method for a wireless device 44 for transmitting on sPDCCH resources is provided. Signaling indicating of at least one of a modification of sPDCCH time resources associated with the wireless device 44 is received and a modification of sPDCCH frequency resources associated with the wireless device 44, is received. Transmission according to the at least one of the modification of sPDCCH time resources and the modification of sPDCCH frequency resources, is performed.

According to one embodiment of this aspect, the modification of sPDCCH time resources associated with the wireless device 44 includes modifying the sPDCCH time resources from a predefined quantity of sPDCCH time resources to another number of sPDCCH time resources. According to one embodiment of this aspect, the modification of sPDCCH time resources associated with the wireless device 44 is based on a reference signal overhead. According to one embodiment of this aspect, the modification of sPDCCH time resources associated with the wireless device 44 is based on a predefined pattern of short transmission time interval (sTTI) durations. According to one embodiment of this aspect, the modification of sPDCCH time resources associated with the wireless device is based on a transmission mode for at least one of a data channel and a grant, for the wireless device 44.

According to one embodiment of this aspect, the modification of sPDCCH frequency resources associated with the wireless device 44 is based on the determined modification of sPDCCH time resources. According to one embodiment of this aspect, the modification of sPDCCH frequency resources associated with the wireless device 44 is based on a predefined number of sPDCCH time resources associated with the wireless device 44.

According to one aspect of the disclosure, a network node 30 for configuring sPDCCH resources for a wireless device 44 is provided. The network node 30 includes a sPDCCH modification module configured to: at least one of determine a modification of sPDCCH time resources associated with the wireless device 44 and determine a modification of sPDCCH frequency resources associated with the wireless device 44, and transmit a grant for the at least one of the modification of sPDCCH time resources and the modification of sPDCCH frequency resources, to the wireless device 44.

According to one aspect of the disclosure, a wireless device 44 for transmitting on sPDCCH resources is provided. The wireless device 44 includes a configuration code configured to: at least one of receive a modification of sPDCCH time resources associated with the wireless device and receive a modification of sPDCCH frequency resources associated with the wireless device 44, and transmit using the at least one of the modification of sPDCCH time resources and the modification of sPDCCH frequency resources.

One or more other embodiments

According to one aspect of the disclosure, a network node 30 for configuring resources for a short Physical Downlink Control Channel, sPDCCH, is provided. The network node 30 includes processing circuitry 34 configured to determine time resources for the sPDCCH based on at least one characteristic associated with transmission, and configure a wireless device 44 using the time resources for the sPDCCH.

According to one embodiment of this aspect, the determination of time resources for the sPDCCH includes determining a number of symbols of the sPDCCH in a subslot. According to one embodiment of this aspect, the at least one characteristic includes a reference signal overhead or a subslot length. According to one embodiment of this aspect, the time resources for the sPDCCH are configured to reduce reference signal overhead for the time resources.

According to one embodiment of this aspect, the at least one characteristic includes a predefined pattern of subslots for the wireless device 44. According to one embodiment of this aspect, the at least one characteristic includes a transmission mode for a data channel and/or a grant for the wireless device 44. According to one embodiment of this aspect, the processing circuitry 34 is further configured to: determine frequency resources for the sPDCCH where the frequency resources are determined independently from the time resources for the sPDCCH, and configure the wireless device 44 using the frequency resources for the sPDCCH.

According to one embodiment of this aspect, frequency resources used for a short control channel element, sCCE, in 2-symbol sPDCCH correspond to frequency resources used for a sCCE in 3-symbol sPDCCH. According to one embodiment of this aspect, the processing circuitry 34 is further configured to determine frequency resources for the sPDCCH based on time resources for the sPDCCH, and configure the wireless device 44 using the frequency resources for the sPDCCH. According to one embodiment of this aspect, the sPDCCH is based on a Demodulation Reference Signal, DMRS.

According to one embodiment of this aspect, the sPDCCH is a two symbol sPDCCH that corresponds to a two symbol subslot or the sPDCCH is a three symbol sPDCCH that corresponds to a three symbol subslot. According to one embodiment of this aspect, the sPDCCH is part of a downlink subframe configured for two symbol TTI, the downlink subframe being configured to include both two symbol sPDCCH and three symbol sPDCCH. According to one embodiment of this aspect, the configuring of the wireless device 44 includes transmitting a scheduling grant or assignment using the time resources for the sPDCCH.

According to another aspect of the disclosure, a method for a network node 30 for configuring resources for a short Physical Downlink Control Channel, sPDCCH, is provided. Time resources for the sPDCCH are determined based on at least one characteristic associated with transmission, and a wireless device 44 is configured using the time resources for the sPDCCH.

According to one embodiment of this aspect, the determination of time resources for the sPDCCH includes determining a number of symbols of the sPDCCH in a subslot. According to one embodiment of this aspect, the at least one characteristic includes a reference signal overhead or a subslot length. According to one embodiment of this aspect, the time resources for the sPDCCH are configured to reduce reference signal overhead for the time resources.

According to one embodiment of this aspect, the at least one characteristic includes a predefined pattern of subslots. According to one embodiment of this aspect, the at least one characteristic includes a transmission mode for a data channel and/or a grant for the wireless device 44. According to one embodiment of this aspect, determining frequency resources for the sPDCCH are determined where the frequency resources are determined independently from the time resources for the sPDCCH, and the wireless device 44 is configured using the frequency resources for the sPDCCH.

According to one embodiment of this aspect, frequency resources used for a short control channel element (sCCE) in 2-symbol sPDCCH correspond to frequency resources used for a sCCE in 3-symbol sPDCCH. According to one embodiment of this aspect, frequency resources for the sPDCCH are determined based on time resources for the sPDCCH, and the wireless device 44 is configured using the frequency resources for the sPDCCH. According to one embodiment of this aspect, the sPDCCH is based on a Demodulation Reference Signal (DMRS).

According to one embodiment of this aspect, the sPDCCH is a two symbol sPDCCH that corresponds to a two symbol subslot or the sPDCCH is a three symbol sPDCCH that corresponds to a three symbol subslot. According to one embodiment of this aspect, the sPDCCH is part of a downlink subframe configured for two symbol TTI, the downlink subframe being configured to include both two symbol sPDCCH and three symbol sPDCCH. According to one embodiment of this aspect, the configuring of the wireless device 44 includes transmitting a scheduling grant or assignment using the time resources for the sPDCCH.

According to one aspect of the disclosure, a wireless device 44 for transmitting on resources indicated in a short Physical Downlink Control Channel, sPDCCH, is provided.

The wireless device 44 includes processing circuitry 48 configured to: receive a configuration on time resources of the sPDCCH in which the time resources being based on at least one characteristic associated with transmission, and transmit according to the configuration.

According to one embodiment of this aspect, the time resources of the sPDCCH include a number of symbols of the sPDCCH in a subslot. According to one embodiment of this aspect, the at least one characteristic includes a reference signal overhead or a subslot length. According to one embodiment of this aspect, the time resources of the sPDCCH are configured to reduce reference signal overhead for the time resources. According to one embodiment of this aspect, the at least one characteristic includes a predefined pattern of subslots for the wireless device 44.

According to one embodiment of this aspect, the at least one characteristic includes a transmission mode for at least one of a data channel and a grant for the wireless device 44. According to one embodiment of this aspect, the processing circuitry 48 is further configured to receive the configuration on frequency resources of the sPDCCH, the frequency resources being configured independently from the time resources of the sPDCCH. According to one embodiment of this aspect, frequency resources used for a short control channel element, sCCE, in 2-symbol sPDCCH is the same as frequency resources used for a sCCE in 3-symbol sPDCCH. According to one embodiment of this aspect, the processing circuitry 48 is further configured to receive the configuration on frequency resources of the sPDCCH, the frequency resources being configured based on the time resources of the sPDCCH. According to one embodiment of this aspect, the sPDCCH is based on a Demodulation Reference Signal, DMRS. According to one embodiment of this aspect, the sPDCCH is a two symbol sPDCCH that corresponds to a two symbol subslot or the sPDCCH is a three symbol sPDCCH that corresponds to a three symbol sTTI. According to one embodiment of this aspect, the sPDCCH is part of a downlink subframe configured for two symbol TTI in which the downlink subframe is configured to include both two symbol sPDCCH and three symbol sPDCCH. According to one embodiment of this aspect, the received configuration includes a scheduling grant or assignment.

According to one aspect of the disclosure, a method for a wireless device 44 for transmitting on resources indicated in a short Physical Downlink Control Channel, sPDCCH, is provided. A configuration is received on time resources of the sPDCCH in which the time resources are based on at least one characteristic associated with transmission. Transmission is performed according to the configuration.

According to one embodiment of this aspect, the time resources for the sPDCCH include a number of symbols of the sPDCCH in a subslot. According to one embodiment of this aspect, the at least one characteristic includes a reference signal overhead or a subslot length. According to one embodiment of this aspect, the time resources of the sPDCCH are configured to reduce reference signal overhead for the time resources. According to one embodiment of this aspect, the at least one characteristic includes a predefined pattern of subslots for the wireless device 44.

According to one embodiment of this aspect, the at least one characteristic includes a transmission mode for at least one of a data channel and a grant for the wireless device 44. According to one embodiment of this aspect, the configuration is received on frequency resources of the sPDCCH in which the frequency resources are configured independently from the time resources of the sPDCCH. According to one embodiment of this aspect, frequency resources used for a short control channel element, sCCE, in 2-symbol sPDCCH is the same as frequency resources used for a sCCE in 3-symbol sPDCCH. According to one embodiment of this aspect, the configuration is received on frequency resources of the sPDCCH in which the frequency resources are configured based on the time resources of the sPDCCH.

According to one embodiment of this aspect, the sPDCCH is based on a Demodulation Reference Signal, DMRS. According to one embodiment of this aspect, the sPDCCH is a two symbol sPDCCH that corresponds to a two symbol subslot or the sPDCCH is a three symbol sPDCCH that corresponds to a three symbol subslot. According to one embodiment of this aspect, the sPDCCH is part of a downlink subframe configured for two symbol TTI in which the downlink subframe is configured to include both two symbol sPDCCH and three symbol sPDCCH. According to one embodiment of this aspect, the received configuration includes a scheduling grant or assignment.

According to one aspect of the disclosure, a network node 30 for configuring resources for a short Physical Downlink Control Channel, sPDCCH, is provided. The network node 30 includes processing circuitry 34 configured to: determine resources for the sPDCCH in which the resources include at least one short resource element groups, sREG, where each sREG includes one resource block, RB, within one orthogonal frequency division multiplexing, OFDM, symbol that includes resource elements, REs, for cell specific reference signal, CRS, and/or demodulation reference signal, DMRS, for use in DMRS based sPDCCH, and configure a wireless device 44 using the resources for the sPDCCH.

According to one embodiment of this aspect, the at least one sREG includes a number of sREGs per short control channel element, sCCE, in which the number of sREGs per sCCE is 4 for DMRS based sPDCCH in 2-symbol sPDCCH or 6 for DMRS based sPDCCH in 3-symbol sPDCCH. According to one embodiment of this aspect, resources include frequency resources in which the frequency resources used for a sCCE in 3-symbol sPDCCH corresponding to frequency resources used for a sCCE in 2-symbol sPDCCH.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for configuring resources for a short Physical Downlink Control Channel (sPDCCH), the network node comprising:
   processing circuitry configured to:
      determine a plurality of orthogonal frequency division multiplexed (OFDM) symbols for the sPDCCH;
      configure a wireless device using the plurality of OFDM symbols;
      determine a first number of physical resource blocks (PRBs) for a short control channel element (sCCE) in a two symbol sPDCCH and determine a second number of PRBs for a sCCE in a three symbol sPDCCH, the first number of PRBs being greater than the second number of PRBs
      configure the wireless device using the determined first number of PRBs for the two symbol sPDCCH and using the second number of PRBs for the two symbol sPDCCH.

2. The network node of claim 1, wherein the sPDCCH is based on a Demodulation Reference Signal (DMRS).

3. The network node of claim 1, wherein the sPDCCH is part of a downlink subframe configured for two symbol transmission time interval (TTI), the downlink subframe being configured to include both two symbol sPDCCH and three symbol sPDCCH.

4. A method for a network node for configuring resources for a short Physical Downlink Control Channel (sPDCCH), the method comprising:
   determining a plurality of orthogonal frequency division multiplexed (OFDM) symbols for the sPDCCH;
   configuring a wireless device using the plurality of OFDM symbols;
   determining a first number of physical resource blocks (PRBs) for a short control channel element (sCCE) in a two symbol sPDCCH and determine a second number of PRBs for a sCCE in a three symbol sPDCCH, the first number of PRBs being greater than the second number of PRBs
   configuring the wireless device using the determined first number of PRBs for the two symbol sPDCCH and using the second number of PRBs for the two symbol sPDCCH.

5. The method of claim 4, wherein the sPDCCH is part of a downlink subframe configured for two symbol transmission time interval (TTI), the downlink subframe being configured to include both two symbol sPDCCH and three symbol sPDCCH.

6. The method of claim 4, wherein the first number of PRBs is 2 and the second number of PRBs is 1.

7. The method of claim 4, wherein the first number of PRBs and the second number of PRBs are distributed in the frequency domain.

8. The method of claim 4, wherein at least one unused PRB of the first number of PRBs and the second number of PRBs is used for a short physical downlink shared channel (sPDSCH).

9. The method of claim 4, wherein a number of symbols for an sPDCCH is selected based at least in part on a number of resource elements available per PRB.

10. The method of claim 4, wherein a third symbol of a three symbol sPDCCH includes up to 12 additional available resource elements per PRB.

11. The method of claim 4, wherein a number of symbols for an sPDCCH is selected based at least in part on a transmission mode of the wireless device.

12. A wireless device for transmitting on resources indicated in a short Physical Downlink Control Channel (sPDCCH), the wireless device comprising:
processing circuitry configured to:
receive a configuration of a first number of physical resource blocks (PRBs) for a short control channel element (sCCE) for a two symbol sPDCCH and of a second number of PRBs for an sCCE for a three symbol sPDCCH, the first number of PRBs being greater than the second number of PRBs;
transmit according to the configuration.

13. The wireless device of claim 12, wherein the sPDCCH is based on a Demodulation Reference Signal (DMRS).

14. The wireless device of claim 12, wherein the sPDCCH is part of a downlink subframe configured for two symbol transmission time interval (TTI), the downlink subframe being configured to include both two symbol sPDCCH and three symbol sPDCCH.

15. A method for a wireless device for transmitting on resources indicated in a short Physical Downlink Control Channel (sPDCCH), the method comprising:
receiving a configuration of a first number of physical resource blocks (PRBs) for a short control channel element (sCCE) for a two symbol sPDCCH and of a second number of PRBs for an sCCE for a three symbol sPDCCH, the first number of PRBs being greater than the second number of PRBs;
transmitting according to the configuration.

16. The method of claim 15, wherein the sPDCCH is based on a Demodulation Reference Signal, DMRS.

17. The method of claim 15, wherein the sPDCCH is part of a downlink subframe configured for two symbol transmission time interval (TTI), the downlink subframe being configured to include both two symbol sPDCCH and three symbol sPDCCH.

\* \* \* \* \*